US010716086B2

(12) United States Patent
Del Regno et al.

(10) Patent No.: US 10,716,086 B2
(45) Date of Patent: Jul. 14, 2020

(54) HYPER ACCURACY LOCATION PLATFORM

(71) Applicant: Verizon Patent and Licensing Inc., Arlington, VA (US)

(72) Inventors: Christopher N. Del Regno, Rowlett, TX (US); Jean M. McManus, Bernardsville, NJ (US); Matthew W. Turlington, Richardson, TX (US); Mohammed M. Rahman, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 174 days.

(21) Appl. No.: 15/693,004

(22) Filed: Aug. 31, 2017

(65) Prior Publication Data

US 2018/0192233 A1 Jul. 5, 2018

Related U.S. Application Data

(60) Provisional application No. 62/441,807, filed on Jan. 3, 2017.

(51) Int. Cl.
*H04W 24/00* (2009.01)
*H04W 64/00* (2009.01)
*G01S 19/41* (2010.01)
*G01S 19/09* (2010.01)
*G01S 19/07* (2010.01)
(Continued)

(52) U.S. Cl.
CPC ......... *H04W 64/003* (2013.01); *G01S 19/071* (2019.08); *G01S 19/073* (2019.08); *G01S 19/09* (2013.01); *G01S 19/41* (2013.01); *H04W 64/00* (2013.01); *G01S 19/43* (2013.01); *H04W 56/00* (2013.01)

(58) Field of Classification Search
CPC ......... H04W 4/02; H04W 4/22; H04W 48/04; H04W 64/00; H04W 76/007; G01C 21/26; G01S 19/07; G01S 19/42
USPC ............ 455/404.1–404.2, 456.1–456.6, 457; 701/468–471
See application file for complete search history.

(56) References Cited

U.S. PATENT DOCUMENTS 5,638,077 A * 6/1997 Martin .................... G01S 5/009
342/357.44
6,297,766 B1 * 10/2001 Koeller ................... G01W 1/10
342/175

(Continued)

*Primary Examiner* — Matthew W Genack

(57) ABSTRACT

A device receives reference data from reference receivers associated with base stations, and synchronizes the reference data to a reference time to generate synchronized reference data for the reference receivers. The device processes the synchronized reference data to determine location error information associated with one or more of the reference receivers, and receives information indicating that a user device, located at an observed location, connects to a particular base station of the base stations. The device determines a location correction for the observed location, or an actual location of the user device, based on particular location error information for a particular reference receiver, of the reference receivers, associated with the particular base station, and causes information identifying the location correction or information identifying the actual location of the user device to be provided to the user device.

20 Claims, 18 Drawing Sheets

(51) Int. Cl.
*H04W 56/00* (2009.01)
*G01S 19/43* (2010.01)

(56) References Cited

U.S. PATENT DOCUMENTS

| | | | | |
|---|---|---|---|---|
| 8,577,734 B2* | 11/2013 | Treyz | ................... | G06Q 20/12 |
| | | | | 705/26.1 |
| 2009/0109090 A1* | 4/2009 | Vollath | ................... | G01S 19/05 |
| | | | | 342/357.24 |
| 2009/0270099 A1* | 10/2009 | Gallagher | ............... | H04W 8/08 |
| | | | | 455/435.1 |
| 2010/0250136 A1* | 9/2010 | Chen | ................... | G06T 1/0021 |
| | | | | 701/300 |
| 2014/0132444 A1* | 5/2014 | Bird | ................... | G01S 19/07 |
| | | | | 342/357.44 |
| 2015/0294555 A1* | 10/2015 | Yamada | ................ | G08B 29/04 |
| | | | | 340/506 |
| 2016/0231431 A1* | 8/2016 | Wilson | ................... | G01S 19/44 |
| 2017/0212247 A1* | 7/2017 | Chen | ................... | G01S 19/24 |

* cited by examiner

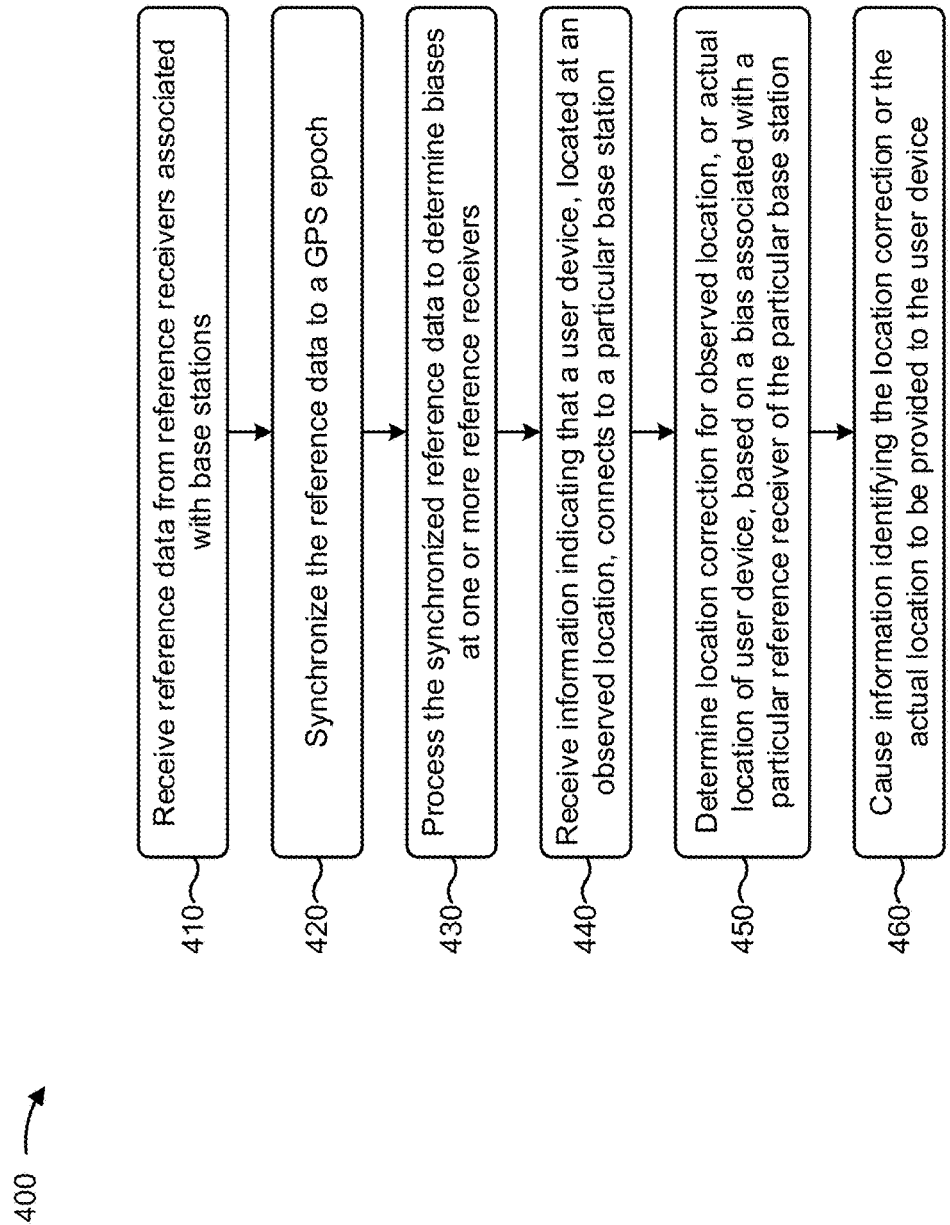

HYPER ACCURACY LOCATION PLATFORM

RELATED APPLICATION

This application claims priority under 35 U.S.C. § 119 based on U.S. Provisional Patent Application No. 62/441,807, filed Jan. 3, 2017, the disclosure of which is incorporated by reference herein in its entirety.

BACKGROUND

The location of user devices, and users of the user devices, is becoming part of many emerging products and services. From traditional applications (e.g., vehicle navigation) to augmented reality applications (e.g., location-based gaming and location-specific experiences) and precision advertising based on location, a location of a user device and a user of the user device is becoming as important as an identification of the user.

To date, user devices have relied on location solutions and technologies with widely varying degrees of accuracy. The most ubiquitous of these technologies is the Global Positioning System (GPS), or, with the addition of other international satellite constellations, is more generally known as the Global Navigation Satellite System (GNSS). A GPS signal in space will provide a worst case pseudo-range accuracy of 7.8 meters at a 95% confidence level, before any terrestrial biases, or errors, are introduced, such as ionospheric delay, tropospheric delay, receiver noise, receiver clock errors, and signal multipath. Multipath is an issue even for survey-grade receivers and antennas, but is much more so on low-end user devices, such as consumer smart phones which have linearly polarized antennas and not right hand circular polarized (RHCP) antennas which even the lowest end GPS receivers implement. As such, the accuracy of GPS-based location can vary significantly.

Many GPS receiver manufacturers have implemented techniques to mitigate the impact of these biases, or errors, on a resultant computed position. As such, many consumer-grade devices can achieve position accuracy of around three meters. Receivers which support reception of Satellite-Based Augmentation System (SBAS) signals can achieve accuracy better than three meters. In other cases, Local Area Augmentation Systems (LAAS), such as those used by airports, can further improve position accuracy. However, most consumer GPS devices in the market today, whether standalone GPS receivers or receivers integrated into consumer smart phones, do not support such correction services.

Most smart phones today support network-based positioning approaches which include determining position based on a cell tower to which a smart phone attaches, Third Generation Partnership Project (3GPP)-based location capabilities, such as timing advance and sounding reference signal, and cellular-received signal strength indicator. However, these approaches cannot provide accuracy below fifty meters at best and provide kilometer accuracy at worst.

BRIEF DESCRIPTION OF THE DRAWINGS

FIG. 4 is a flow chart of an example process for determining a hyper accurate location of a user device;

DETAILED DESCRIPTION OF PREFERRED EMBODIMENTS

Figure 1A:
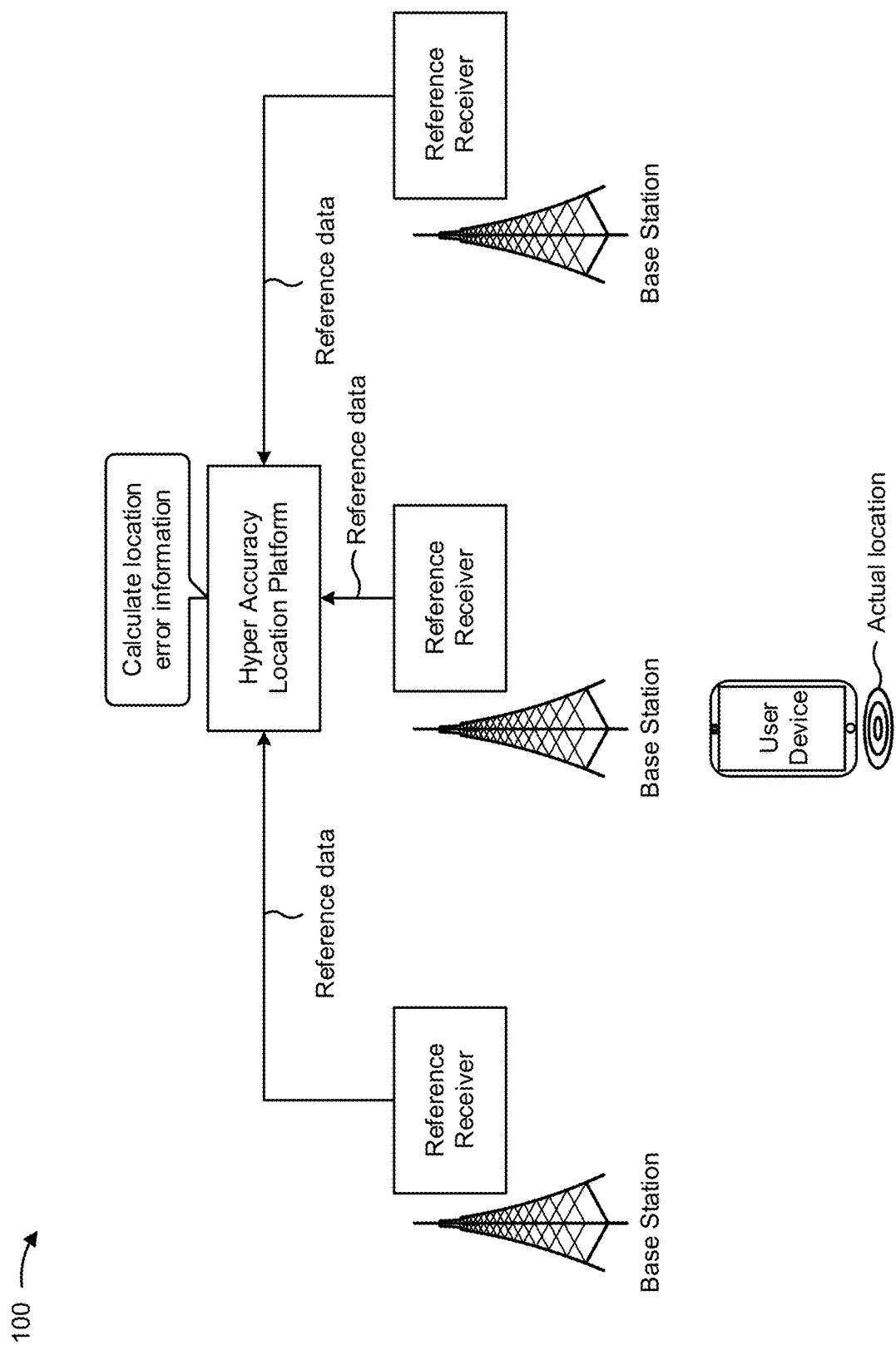
FIGS. 1A and 1B are diagrams of an overview of an example implementation described herein.

The following detailed description of example implementations refers to the accompanying drawings. The same reference numbers in different drawings can identify the same or similar elements.

While classical GPS positioning uses a time offset, or delay, of a GPS first legacy (L1) signal pseudocode sequence, real-time kinematics (RTK) leverages a phase of a carrier, without regard to information modulated on the carrier. This yields a L1 wavelength of nineteen (19) centimeters and a second legacy (L2) signal wavelength of 24.4 centimeters. The ability to track a position based on the phase of a 19 or 24.4 centimeter wavelength can provide great accuracy, approaching millimeter precision. This technology is often used in surveying, precision agriculture (e.g., auto-steer systems), and precision construction. However, the equipment used for RTK is typically very expensive relative to consumer devices and applications. Further, RTK requires the use of at least one, well-surveyed base station of similar expense. In industries where the equipment costs (e.g., road graders, bulldozers, combines, harvesters, etc.) run in the hundreds of thousands to millions of dollars, expensive navigation solutions can be supported, even if setup and operation of those solutions can not be simple. However, the typical distances supported by existing single base station solutions are limited to ten kilometers.

There have been some small, cooperative networks set up to sell a reference network service based on RTK positioning. This allows high-end users (e.g., surveyors) to use RTK-capable equipment without the expense of setting up a reference base station. These networks typically operate as a cooperative network where an owner of a permanent reference base station permits the base station to be added to a network and then receives free reference network service for a period of time. The operator of the network then sells network corrections for thousands of dollars per year for each end user device.

Most RTK-capable receivers require significant computing resources in the receiver. Typically an antenna, a receiver, and a computer are integrated into a single RTK-capable receiver. While this is sufficient for high-end users, this is not amenable to applications associated with user devices with limited computing and networking capabilities.

Some position accuracy mechanisms for a user device and/or a network provider have been used for non-mission-critical applications such as consumer navigation, geocaching, augmented reality gaming, and/or the like, where hyper accuracy is not required. However, in the emerging markets of autonomous vehicles, drones, mobile robotics, precision advertising, and/or the like, the position accuracy available from more traditional mechanisms is insufficient. For example, a consumer robotics manufacturer can require installation of underground wiring (e.g., electronic fencing), or a consumer can require perimeter radio frequency (RF) transmitters to keep an autonomous mower away from flower beds, a pool, and/or the like. Further, ride-share services, which rely heavily on consumer location (e.g., pickup location) for their livelihood, are often stymied by poor location resolution in urban canyons or merely inconvenienced by not being able to accurately determine on which side of a street a customer is located.

Some implementations, described herein, provide systems and/or methods that provide centimeter-level accuracy for user devices and user device applications. The systems and/or methods can utilize RTK, a large network of reference base stations, real-time analysis of space and terrestrial biases affecting GPS signals, real-time cloud-based processing of carrier-phase observables from base stations and reference receivers and low-end GPS receivers to provide between sub-meter position accuracy and centimeter to millimeter position accuracy for user devices.

Figure 1B:
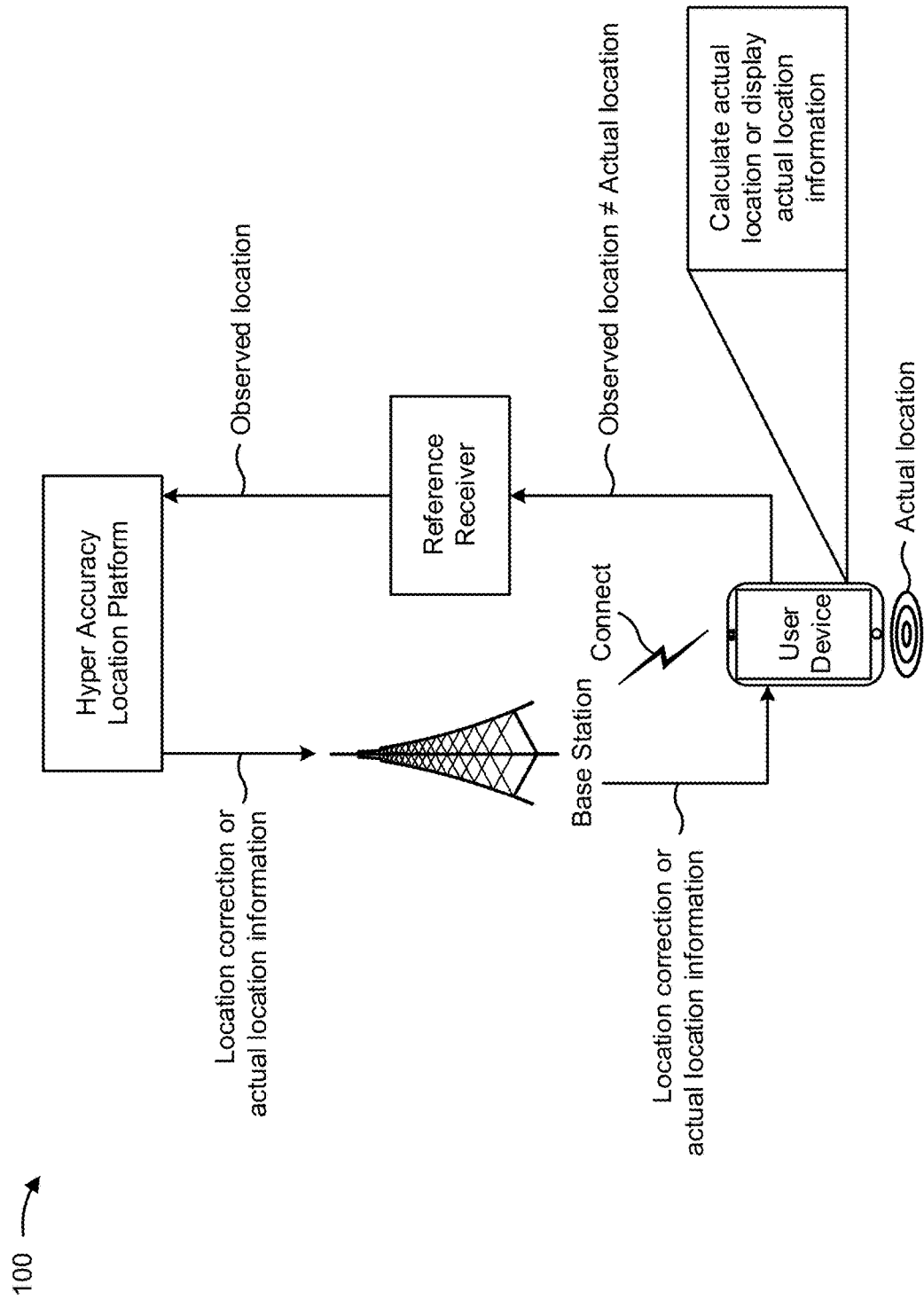

FIGS. 1A and 1B are diagrams of an overview of an example implementation 100 described herein. As shown in FIG. 1A, assume that reference receivers, associated with corresponding base stations, send reference data to a hyper accuracy location platform (e.g., provided by a controller device and one or more aggregation devices, not shown). The reference data can include, for example, raw pseudo range observations and phase range observations received by the reference receivers. As further shown in FIG. 1A, the hyper accuracy location platform can receive the reference data, and can calculate location error information based on the reference data. In one example, the location error information can include information associated with terrestrial biases or errors, such as ionospheric delay, tropospheric delay, receiver noise, receiver clock errors, and/or signal multipath that are introduced at each reference receiver.

As shown in FIG. 1B, assume that a user device, located at an actual location, connects to one of the base stations and an associated reference receiver. When the user device connects to the base station, the user device can determine an observed location of the user device (e.g., utilizing GPS), and can provide the observed location to the reference receiver. The reference receiver can receive the observed location, which is different than the actual location of the user device (e.g., due to errors introduced by the GPS of the user device). As further shown in FIG. 1B, the reference receiver can provide the observed location to the hyper accuracy location platform, and the hyper accuracy location platform can receive the observed location. If the user device is capable of calculating the actual location, the hyper accuracy location platform can calculate location correction information based on the location error information (e.g., determined for the reference receiver associated with the user device) and the observed location provided by the user device. If the user device is incapable of calculating the actual location (e.g., when the user device does not expose GNSS, has an intermittent connection to the base station, or has insufficient computing resources to calculate RTK), the hyper accuracy location platform can calculate the actual location of the user device based on the location error information and the observed location.

As further shown in FIG. 1B, the hyper accuracy location platform can provide the location correction information or actual location information to the user device (e.g., via the base station) depending on the capability of the user device. If the user device receives the location correction information, the user device can calculate the actual location information of the user device based on the observed location and the location correction information. The user device can display the actual location information (e.g., showing the actual location of the user device as opposed to the observed location) to a user of the user device and/or can send the actual location information to another device.

The hyper accuracy location platform can include a location service that provides an accuracy of location to within centimeters (hyper accuracy) for inexpensive user devices, which is not provided by GPS systems for such user devices. This can improve performance of the user devices, applications associated with the user devices (e.g., ride share applications, autonomous devices, and/or the like), and/or services provided to users of the user devices (e.g., ride sharing service, and/or the like). Further, the user devices can perform functions (e.g., determining hyper accurate locations of the user devices) that user devices were incapable of performing before. Moreover, the hyper accuracy location platform can enable a user device to conserve resources (e.g., processor, memory, and/or the like) since the user device can not need to continuously connect to a network, can not need to calculate hyper accurate location information, and/or the like.

As indicated above, FIGS. 1A and 1B are provided merely as an example. Other examples are possible and can differ from what was described with regard to FIGS. 1A and 1B.

Figure 2:
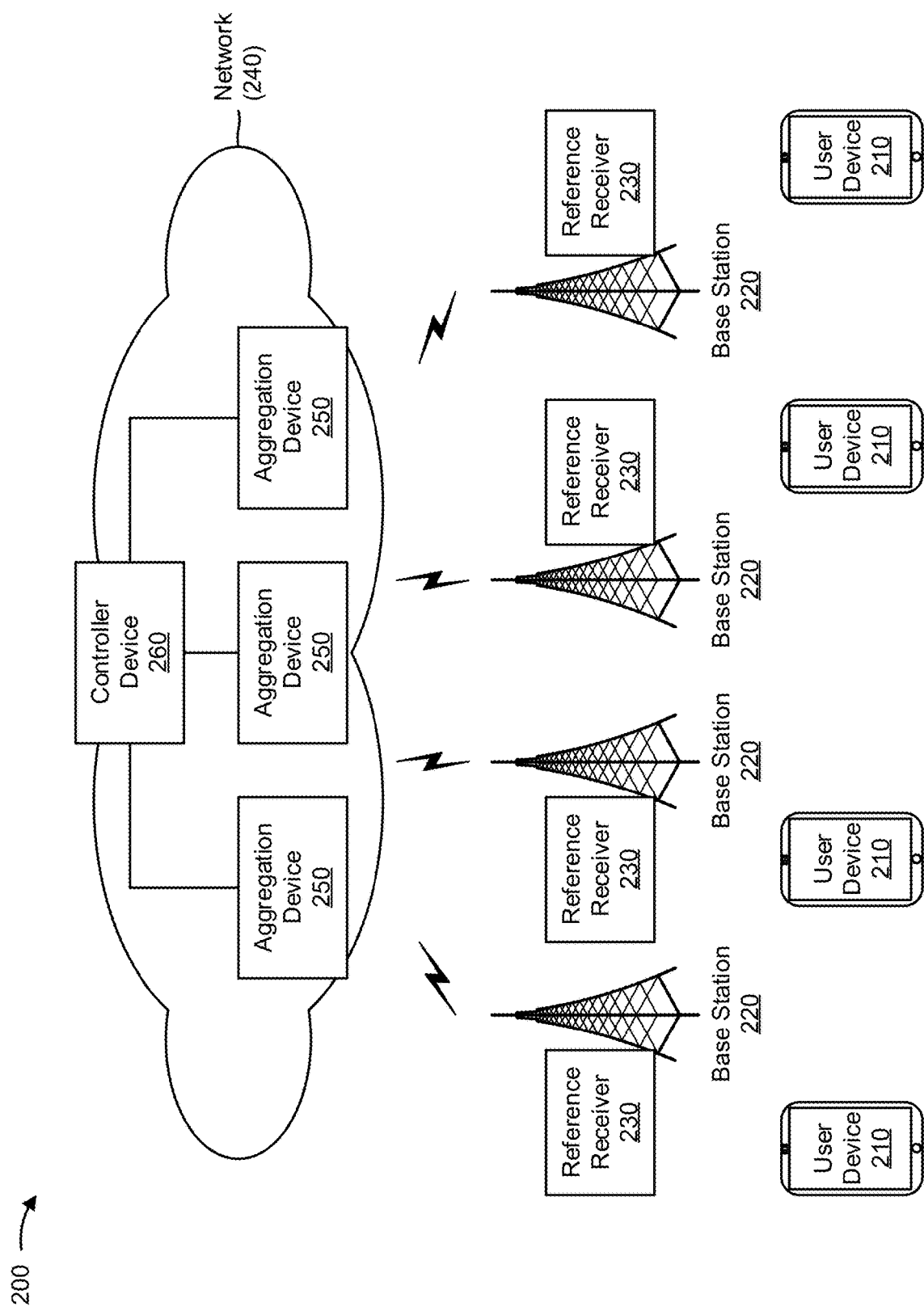
FIG. 2 is a diagram of an example environment in which systems and/or methods, described herein, can be implemented.

FIG. 2 is a diagram of an example environment 200 in which systems and/or methods described herein can be implemented. As shown in FIG. 2, environment 200 can include multiple user devices 210, multiple base stations 220, multiple reference receivers 230 (associated with base stations 220), and a network 240 that includes multiple aggregation devices 250 and a controller device 260. Devices of environment 200 can interconnect via wired connections, wireless connections, or a combination of wired and wireless connections.

User device 210 includes one or more devices capable of receiving, generating, storing, processing, and/or providing information, such as information described herein. For example, user device 210 can include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a GPS device, or a similar type of device. In some implementations, user device 210 can receive information from and/or transmit information to another device in environment 200, such as base stations 220.

Base station 220 includes one or more devices capable of receiving, generating, storing, processing, and/or providing information, such as information described herein. For example, base station 220 can include an eNodeB associated with a Long Term Evolution (LTE) network that receives traffic from and/or sends traffic to network 240. Additionally, or alternatively, one or more base stations 220 can be associated with a random access network (RAN) that is not associated with a LTE network. Base station 220 can send traffic to and/or receive traffic from user devices 210 via an air interface. In some implementations, base station 220 can include a small cell base station, such as a base station of a microcell, a picocell, and/or a femtocell.

In some implementations, base station 220 can be associated with an evolved packet system (EPS) that includes a LTE network and/or an evolved packet core (EPC). The LTE network can include a RAN that includes one or more base stations 220 via which user devices 210 communicate with the EPC. The EPC can include a management entity device (MME), a serving gateway (SGW), and/or a packet data network gateway (PGW) that enable user devices 210 to communicate with network 240 and/or an Internet protocol (IP) multimedia subsystem (IMS) core. The IMS core can include a home subscriber server (HSS) and/or an authentication, authorization, and accounting server (AAA), and can manage device registration and authentication, session initiation, etc., associated with user devices 210. The HSS and/or the AAA can reside in the EPC and/or the IMS core.

Reference receiver 230 includes one or more devices capable of receiving, generating, storing, processing, and/or providing information, such as information described herein. For example, reference receiver 230 can include a device, such as a computing device with an antenna for receiving position information. In some implementations, reference receiver 230 can receive information from and/or transmit information to user devices 210, base stations 220, and/or aggregation devices 250.

Network 240 includes one or more wired and/or wireless networks. For example, network 240 can include can include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Aggregation device 250 includes one or more devices capable of receiving, generating, storing, processing, and/or providing information, such as information described herein. For example, aggregation device 250 can include a computing device, such as a server device or a group of server devices. In some implementations, aggregation device 250 can receive information from and/or transmit information to reference receivers 230, other aggregation devices 250, and/or controller device 260.

Controller device 260 includes one or more devices capable of receiving, generating, storing, processing, and/or providing information, such as information described herein. For example, controller device 260 can include a computing device, such as a server device or a group of server devices. As another example, controller device 260 can be implemented as one or more computing devices of a cloud computing environment or a data center. In some implementations, controller device 260 can receive information from and/or transmit information to aggregation devices 250.

In some implementations, aggregation devices 250 and controller device 260 can correspond to a hyper accuracy location platform. In some implementations, controller device 260 can correspond to a hyper accuracy location platform.

The number of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, one or more of the devices of environment 200 can perform one or more functions described as being performed by another one or more devices of environment 200.

Figure 3:
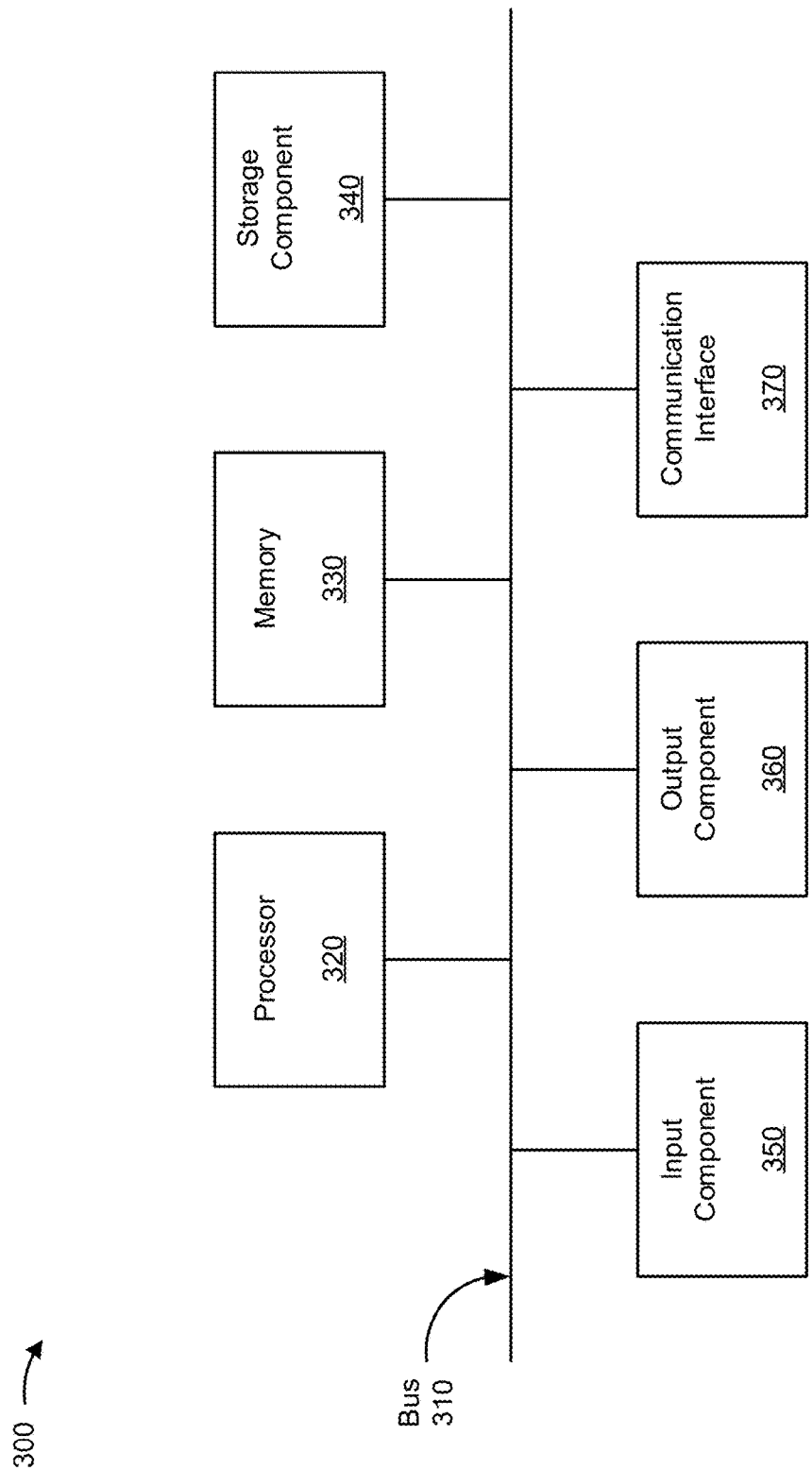
FIG. 3 is a diagram of example components of one or more devices of FIG. 2.

FIG. 3 is a diagram of example components of a device 300. Device 300 can correspond to user device 210, base station 220, reference receiver 230, aggregation device 250, and/or controller device 260. In some implementations, user device 210, base station 220, reference receiver 230, aggregation device 250, and/or controller device 260 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processor. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 can include a sensor for sensing information (e.g., a global positioning system (GPS) component, an accelerometer, a gyroscope, an actuator, etc.). Output component 360 includes a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for determining a hyper accurate location of a user device. In some implementations, one or more process blocks of FIG. 4 can be performed by aggregation device 250 and/or controller device 260. In some implementations, one or more process blocks of FIG. 4 can be performed by another device or a group of devices separate from or including aggregation device 250 and/or controller device 260, such as user device 210.

As shown in FIG. 4, process 400 can include receiving reference data from reference receivers associated with base stations (block 410). For example, aggregation device 250 can receive reference data from one or more corresponding reference receivers 230. In some implementations, reference receivers 230 can generate the reference data, and can provide the reference data to aggregation device 250. In some implementations, a particular aggregation device 250 can obtain reference data from another device (e.g., a reference receiver 230 that is not associated with the particular aggregation device 250, another aggregation device 250, and/or the like).

In some implementations, aggregation device 250 can continuously receive the reference data from the one or more corresponding reference receivers 230. Additionally, or alternatively, aggregation device 250 can periodically receive the reference data from the one or more corresponding reference receivers 230. Additionally, or alternatively, aggregation device 250 can periodically request the reference data from the one or more corresponding reference receivers 230, and can receive the reference data from the one or more corresponding reference receivers 230 based on the request.

In some implementations, a homogenous network of reference receivers 230 can be deployed at base stations 220 to leverage locations of base station 220 and backhaul networking associated with base stations 220. In some implementations, each reference receiver 230 can include a geodetic grade antenna that is placed on a tower of a corresponding base station 220 in order to achieve a clear, open sky view, and to reduce the impact of multipath on observations of reference receiver 230. In some implementations, each reference receiver 230 can be installed either in a physical structure (e.g., a hut, a cabinet, a chassis, and/or the like) connected to the corresponding base station 220. In some implementations, reference receiver 230 can connect to a cell site router (CSR) (e.g., associated with base station 220) via an Ethernet connection, but can also have other connections (e.g., a serial connection for monitoring). In some implementations, if physical connections are not available, reference receiver 230 can use a cellular router (e.g., a LTE router, a 5G router) to connect to network 240. In some implementations, reference receiver 230 can connect to equipment of base station 220 to provide GPS timing, and can send raw observations to network 240 (e.g., to aggregation devices 250 and/or controller device 260) for processing. In some implementations, bandwidth requirements for reference receiver 230 can be low (e.g., on the order of tens of kilobits per second).

In some implementations, a reference receiver 230 can be provided at each base station 220. Such an arrangement can use a maximum separation of ten kilometers between user device 210 and a reference receiver 230. For example, deploying a network based on a ten kilometer maximum separation can use tens of thousands of reference receivers 230 and a flexible mechanism to identify which reference receiver 230 is to be used for each user device 210. However, in some implementations, a reference receiver 230 can not be provided at each base station 220. In such implementations, reference receivers 230 can be provided at a particular number of base stations 220 to form a network of reference receivers 230. The network of reference receivers 230 can enable a maximum separation of one-hundred kilometers or more between user device 210 and reference receiver 230. In this way, a number of reference receivers 230 can be reduced, and a cost and a complexity associated with the network of reference receivers 230 can be reduced, while still providing a cost-effective location service.

The reference data can include, for example, raw pseudo range observations and/or phase range observations received by reference receivers 230. In some implementations, each reference receiver 230 can generate raw pseudo range observations and phase range observations at least once per second (e.g., 1 Hertz), or more frequently. In order to collect and process data from hundreds or thousands of reference receivers 230, a scalable network of aggregation devices 250 can be used. In some implementations, reference receivers 230 can send raw data in a particular format (e.g., a Radio Technical Commission for Maritime Services (RTCM3) format) to primary and secondary aggregation devices 250 (e.g., Network Transport of RTCM via Internet Protocol (NTRIP) servers) in parallel. In some implementations, each aggregation device 250 can collect the raw data, aggregate the raw data, and transmit the aggregated raw data to other aggregation devices 250 for processing. Additionally, or alternatively, each aggregation device 250 can collect the raw data, aggregate the raw data, and transmit the aggregated raw data to controller device 260 for processing.

In some implementations, aggregation device 250 can log the aggregated data locally for accounting and troubleshooting purposes. In some implementations, other aggregation devices 250 can receive the aggregated data, and can deliver the aggregated data to controller device 260. In some implementations, if scale requires, the other aggregation devices 250 can further aggregate the data, and can provide the further aggregated data to controller device 260. In some implementations, the collection and aggregation of data by aggregation device 250 can serve as an interface to user devices 210.

In some implementations, controller device 260 can perform the functions described above in connection with aggregation devices 250. For example, controller device 260 can receive reference data from one or more corresponding reference receivers 230, can aggregate the reference data, and can process the aggregated data. In some implementations, controller device 260 can not aggregate the reference data, and can process the reference data.

As further shown in FIG. 4, process 400 can include synchronizing the reference data to a GPS epoch (block 420). For example, aggregation device 250 can synchronize the reference data to a GPS epoch or a reference time. In some implementations, aggregation devices 250 can provide the reference data (or aggregated referenced data) to controller device 260, and controller device 260 can synchronize the reference data to a GPS epoch. In some implementations, aggregation device 250 can receive and synchronize the reference data from one or more reference receivers 230. In some implementations, aggregation device 250 can synchronize the reference data to a same GPS epoch for appropriate processing.

In some implementations, aggregation devices 250 can be distributed in order to scale to a large footprint and to simultaneously serve millions to hundreds of millions of user devices 210. Since environmental biases introduced to GNSS signals tend to vary geographically (e.g., ionospheric charging due to solar activity, tropospheric delay variations due to regional weather conditions, and/or the like), and since satellites visible in one region (e.g., the West Coast) can be significantly different than satellites visible in another region (e.g., the East Coast), the processing distribution of aggregation devices 250 can be provided on a regional basis to distribute the workload and to limit the processing of the reference data to applicable regions. In such implementations, a regional network 240 and a regional controller device 260 can be associated with each group of regional aggregation devices 250.

As further shown in FIG. 4, process 400 can include processing the synchronized reference data to determine biases at one or more reference receivers (block 430). For example, aggregation device 250 can process the synchronized reference data to determine one or more biases at each reference receiver 230 associated with aggregation device 250. In some implementations, controller device 260 can process the synchronized reference data to determine one or more biases at each reference receiver 230.

In some implementations, aggregation device 250 can process the synchronized reference data from multiple reference receivers 230 to determine an impact of various satellite and terrestrial biases at each reference receiver 230. For example, aggregation device 250 can interpolate the effects between and among reference receivers 230 to create an error surface (e.g., a (p+1)-dimensional surface representing error terms of a model depending on p parameters) across a region for each bias. With this error surface, when user device 210 connects somewhere between reference receivers 230, aggregation device 250 can utilize the reference data from a closest reference receiver 230 to provide interpolated corrections appropriate for a location of user device 210.

In some implementations, controller device 260 can utilize the reference data from a closest reference receiver 230 to provide the interpolated corrections appropriate for the location of user device 210. In some implementations, this can be accomplished using a Virtual Reference Station (VRS) approach. A VRS is a virtual, unoccupied reference station that includes a position determined based on data of surrounding reference receivers 230. In the VRS approach, instead of streaming observables from a closest physical reference receiver 230 to user device 210, aggregation device 250 and/or controller device 260 can create a virtual station (e.g., a virtual reference receiver 230) near a current location of user device 210. User device 210 can appear to be connected to a physical reference receiver 230 (e.g., as represented by the virtual reference receiver 230) adjacent to or very close to the current location of user device 210. However, aggregation device 250 and/or controller device 260 can provide virtual observation data that is a combination of real physical observation data and an error surface in a region. In some implementations, when there is a smaller number of user devices 210 simultaneously utilizing base station 220, a single VRS can be created for each user device 210. In some implementations, when there is a larger number of user devices 210 simultaneously utilizing base station 220, a shared VRS can be created for a number of user devices 210 provided within a range of some defined distance. Once the shared VRS is created, raw data received by the shared VRS can be provided to one of aggregation devices 250 for distribution to user devices 210. In such implementations, user devices 210 can receive the same reference station identifier for the shared VRS, and can receive the same raw pseudo-observation data and network corrections.

In some implementations, processing of the synchronized reference data can be distributed by controller device 260 to one or more aggregation devices 250. For example, aggregation device 250 can process some of the synchronized reference data, which can be provided to controller device 260 for final processing and determination of one or more biases at each reference receiver 230.

As further shown in FIG. 4, process 400 can include receiving information indicating that a user device, located at an observed location, connects to a particular base station (block 440). For example, controller device 260, via reference receiver 230, can receive an indication that user device 210, located at an observed location, connects to a particular base station 220.

In some implementations, user device 210 can connect to base station 220 and can provide an observed location of user device 210 to reference receiver 230 via base station 220. For example, the observed location can be provided in a signal used to connect user device 210 and base station 220, if GPS is enabled in user device 210. In some implementations, user device 210 can connect to base station 220, and reference receiver 230 can request the observed location from user device 210 based on user device 210 connecting to base station 220. User device 210 can provide information identifying the observed location to reference receiver 230 based on the request.

In some implementations, the observed location of user device 210 can include an uncorrected GPS position of user device 210. The uncorrected GPS position of user device 210 can be based on trilateration using pseudoranges derived by determining a latency of pseudocode in a L1 signal and by tracking a phase of a L1 carrier. However, most consumer GPS receiver devices (e.g., in consumer cellular devices) do not expose carrier phase information, but are capable of exposing such information. In some implementations, user device 210 can be updated to expose the carrier phase information (e.g., the GNSS carrier phase) locally within user device 210. For example, user device 210 can be updated to provide the carrier phase information to a network location service (e.g., to aggregation devices 250 and/or controller device 260, via reference receivers 230) for processing.

While it is possible to expose L1 carrier phase tracking on consumer cellular devices, current GPS receiver devices (e.g., in consumer cellular devices) can rely on the same linearly polarized antenna that is used for cellular reception. In some implementations, user device 210 can be modified to include a dedicated GPS-capable antenna, separate from a cellular antenna. In this way, a dedicated GPS-capable antenna can improve RTK performance of user device 210, and can improve uncorrected GPS performance for applications (e.g., executable by user device 210) that are not RTK-capable or have not been authorized for RTK service.

As further shown in FIG. 4, process 400 can include determining a location correction for the observed location, or an actual location of the user device, based on a bias associated with a particular reference receiver of the particular base station (block 450). For example, aggregation device 250 can determine a location correction for the observed location, or an actual location of user device 210, based on a bias associated with a particular reference receiver 230 of the particular base station 220. Additionally, or alternatively, controller device 260 can determine the location correction for the observed location, or the actual location of user device 210, based on a bias associated with the particular reference receiver 230 of the particular base station 220. In some implementations, user device 210 can be associated with (e.g., connected to) the particular reference receiver 230 and/or the particular base station 220.

In some implementations, aggregation device 250 and/or controller device 260 can process the synchronized reference data from multiple reference receivers 230 to determine an impact of various satellite and terrestrial biases at each reference receiver 230. For example, aggregation device 250 and/or controller device 260 can interpolate the effects between and among reference receivers 230 to create an error surface across a region for each bias. With this error surface, when user device 210 connects somewhere between reference receivers 230, aggregation device 250 and/or controller device 260 can utilize the reference data from a closest reference receiver 230 and the error surface to determine the location correction for the observed location of user device 210.

In some implementations, aggregation device 250 and/or controller device 260 can calculate the location correction for the observed location of user device 210 when user device 210 can calculate RTK, maintains a connection with base station 220, and exposes the GNSS carrier phase. For example, user device 210 can detect and expose the GNSS carrier phase, can maintain an active connection with base station 220, and can include sufficient computing resources to combine local and reference observation data and derive a RTK-fixed correction for the observed location of user device 210. In such an example, user device 210 can utilize RTK positioning, the location correction, and the observed location to determine the actual location of user device 210.

In some implementations, aggregation device 250 and/or controller device 260 can calculate an actual location of user device 210 when user device 210 does not expose GNSS carrier phase, has an intermittent connection with base station 220, or has insufficient computing resources to calculate RTK. In such implementations, aggregation device 250 and/or controller device 260 can determine the location correction for the observed location of user device 210, as described above, and can utilize RTK positioning, the location correction, and the observed location to determine the actual location of user device 210. In some implementations, user device 210 can include an application or an operating system-level location service that enables user device 210 to receive the actual location from aggregation device 250 and/or controller device 260.

Using aggregation devices 250 and/or controller device 260 to calculate RTK positions of user devices 210 can present a scaling challenge. In some implementations, the scaling challenge can be addressed by implementing RTK algorithms in aggregation devices 250 using scaling approaches, such as load distribution, distributed system kernels, and micro-services architectures. In this way, aggregation devices 250 can distribute and share RTK calculations as needed based on customer demand.

As further shown in FIG. 4, process 400 can include causing information identifying the location correction or the actual location to be provided to the user device (block 460). For example, aggregation device 250 can cause information identifying the location correction or the actual location to be provided to user device 210. Additionally, or alternatively, controller device 260 can cause information identifying the location correction or the actual location to be provided to user device 210. In some implementations, controller device 260 can cause information identifying the location correction or the actual location to be provided to devices other than user device 210, such as one or more server devices providing services for user device 210.

In some implementations, controller device 260 can provide the information identifying the location correction or the actual location to a particular aggregation device 250 associated with the particular base station 220 serving user device 210. The particular aggregation device 250 can provide the information identifying the location correction or the actual location to the particular base station 220 serving user device 210. The particular base station 220 can provide the information identifying the location correction or the actual location to user device 210.

In some implementations, controller device 260 can provide the information identifying the location correction or the actual location directly to the particular base station 220 serving user device 210. The particular base station 220 can provide the information identifying the location correction or the actual location to user device 210.

In some implementations, aggregation device 250 can provide the information identifying the location correction or the actual location directly to the particular base station 220 serving user device 210. The particular base station 220 can provide the information identifying the location correction or the actual location to user device 210.

In some implementations, aggregation device 250 and/or controller device 260 can provide information identifying the location correction or information identifying the actual location to user device 210 depending on capabilities of user device 210. For example, aggregation device 250 and/or controller device 260 can provide the information identifying the location correction to user device 210 when user device 210 can calculate RTK, maintains a connection with base station 220, and exposes GNSS carrier phase. In such implementations, user device 210 can receive the information identifying the location correction, and can utilize RTK positioning, the location correction, and the observed location to determine the actual location of user device 210. The actual location of user device 210 can provide between sub-meter position accuracy and centimeter to millimeter position accuracy.

Alternatively, aggregation device 250 and/or controller device 260 can provide the information identifying the actual location of user device 210 to user device 210 when user device 210 does not expose GNSS, has an intermittent connection with base station 220, or has insufficient computing resources to calculate RTK. In such implementations, user device 210 can receive the information identifying the actual location of user device 210.

Many applications, in which GPS is used, use a data connection (e.g., to deliver map graphics, to calculate a route, and/or the like). However, some user devices 210 can have intermittent connections with base stations 220. In some implementations, aggregation device 250 and/or controller device 260 can allow intermittently connected user devices 210 to achieve centimeter-level positioning. For example, user device 210 can briefly enable a GPS receiver of user device 210, can log raw observation data (e.g., location data), and can transmit the raw observation data to aggregation device 250 and/or controller device 260, via base station 220. The raw observation data can include a few seconds of data to a few minutes of data. Aggregation device 250 and/or controller device 260 can perform a near-real time post processing on the raw observation data, based on reference data received from reference receivers 230. Aggregation device 250 and/or controller device 260 can perform RTK calculations on the raw observation data, and can derive an integer solution (e.g., a kinematic fix) or a floating point solution (e.g., a kinematic float) for a location of user device 210. Aggregation device 250 and/or controller device 260 can provide a higher accuracy location result to user device 210, and/or can store the higher accuracy location result.

Furthermore, operation of GPS receivers in user devices 210 can be power intensive, and GPS receivers of user devices 210 can include additional computing resources that perform position resolution and functions to improve a quality of position resolution. In some implementations, by calculating RTK positions of user devices 210 with aggregation devices 250 and/or controller device 260, user devices 210 can only need to collect raw observation data and send the data to aggregation devices 250 (e.g., via reference receivers 230). In this way, the computations performed by user devices 210 can be reduced, and power consumption by user devices 210 can be lowered. In some implementations, the hyper accurate location information of user devices 210 may be used for emergency situations (e.g., so that emergency personnel can locate users, associated with user devices 210, who might need emergency assistance).

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Additionally, or alternatively, aggregation device 250 and/or controller device 260 can automatically discover the reference data, and can utilize one or more techniques to perform one or more blocks of FIG. 4 based on the reference data. For example, aggregation device 250 and/or controller device 260 can utilize a machine learning technique, an artificial intelligence technique, a data mining technique, a modeling technique, a neural network technique, another type of big data technique, or a combination of two or more of these techniques to perform one or more blocks of FIG. 4. Furthermore, the analysis of the reference data can be a big data problem since environment 200 can include tens, hundreds, or thousands of base stations 220 and/or reference receivers 230, and each reference receiver 230 can provide thousands, millions, billions, trillions, or more of items of data.

In some implementations, the machine learning technique can include algorithms that can change based on new data. The machine learning technique can search through data to detect patterns in the data, and can adjust actions of the machine learning algorithm based on the detected patterns. Machine learning algorithms can be categorized as being supervised or unsupervised. For example, supervised machine learning algorithms can apply what has been learned in the past to new data, and unsupervised machine learning algorithms can draw inferences from data.

In some implementations, the artificial intelligence technique can include a simulation of human intelligence processes by computers. The processes can include learning (e.g., the acquisition of information and rules for using the information), reasoning (e.g., using the rules to reach approximate or definite conclusions), and self-correction. The artificial intelligence technique can perform tasks, such as identifying patterns in data, more efficiently and accurately than humans, and, when presented with an unfamiliar task, can include enough intelligence to find a solution to the task.

In some implementations, the data mining technique can include sorting through data to identify patterns and establish relationships. Parameters of the data mining technique can include association (e.g., searching for patterns where one event is connected to another event); sequence or path analysis (e.g., searching for patterns where one event leads to another later event); classification (e.g., searching for new patterns in data, which can result in a change in the way the data is organized); clustering (e.g., determining and documenting groups of facts not previously known); and forecasting (e.g., discovering patterns in data that can lead to reasonable predictions about the future, which is also known as predictive analytics).

In some implementations, the modeling technique can include modeling data to resolve complex relationships among the data, to define and categorize the data, and to establish standard definitions and descriptors so that the data can be utilized by other systems.

In some implementations, the neural network technique can include a system of hardware and/or software patterned after the operation of neurons in the human brain. The neural network technique can solve complex problems, such as pattern recognition problems. The neural network can be initially trained based on large amounts of data. The training can include providing an input to the neural network, and informing the neural network what should be the output.

In some implementations, any function described herein as being performed by aggregation device 250 can be performed by controller device 260, and any function described herein as being performed by controller device 260 can be performed by aggregation device 250.

Figure 5A:
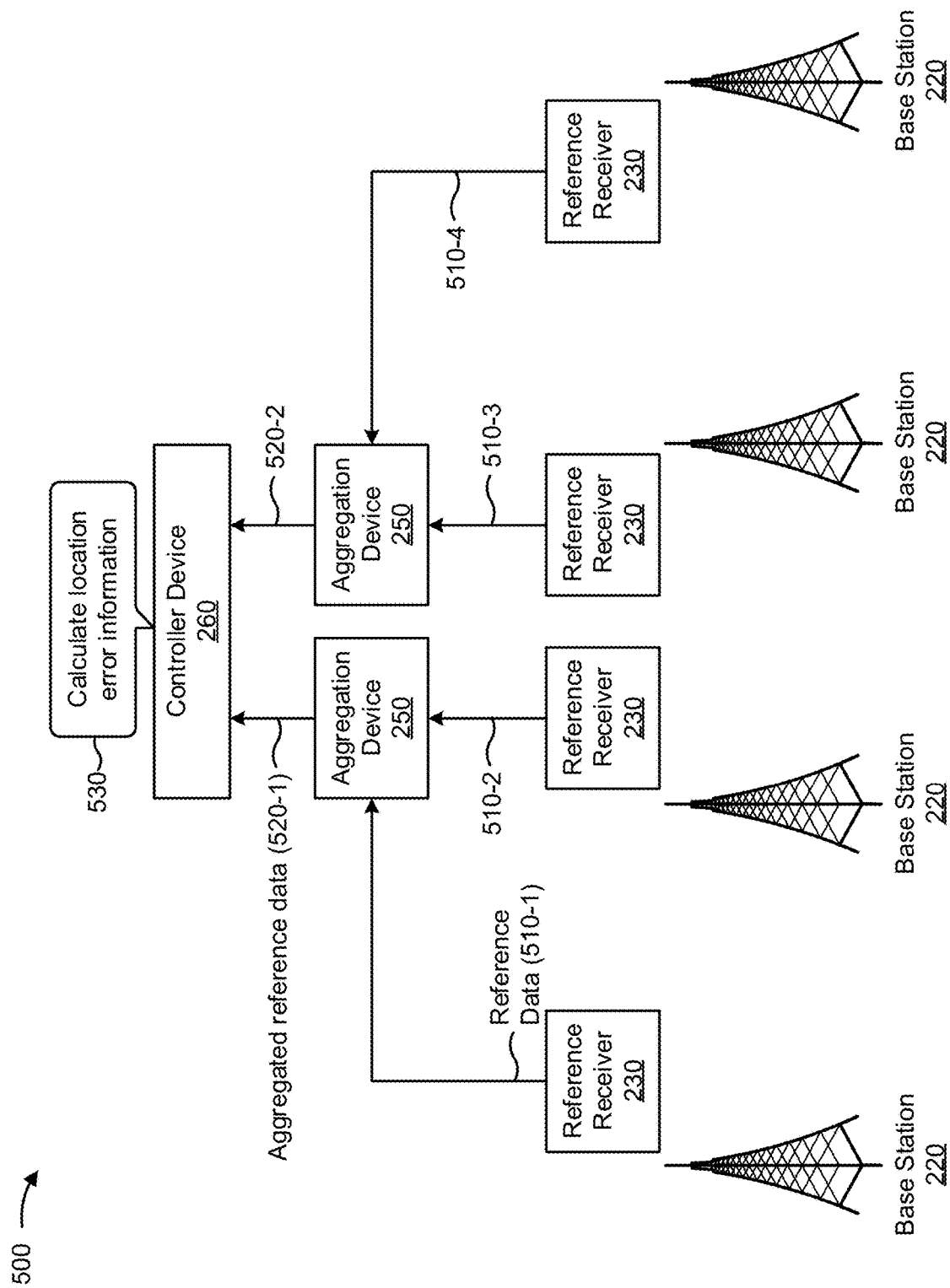
FIGS. 5A-5C are diagrams of an example implementation for capturing reference data associated with a network and for determining a hyper accurate location of a user device based on the reference data.
Figure 5B:
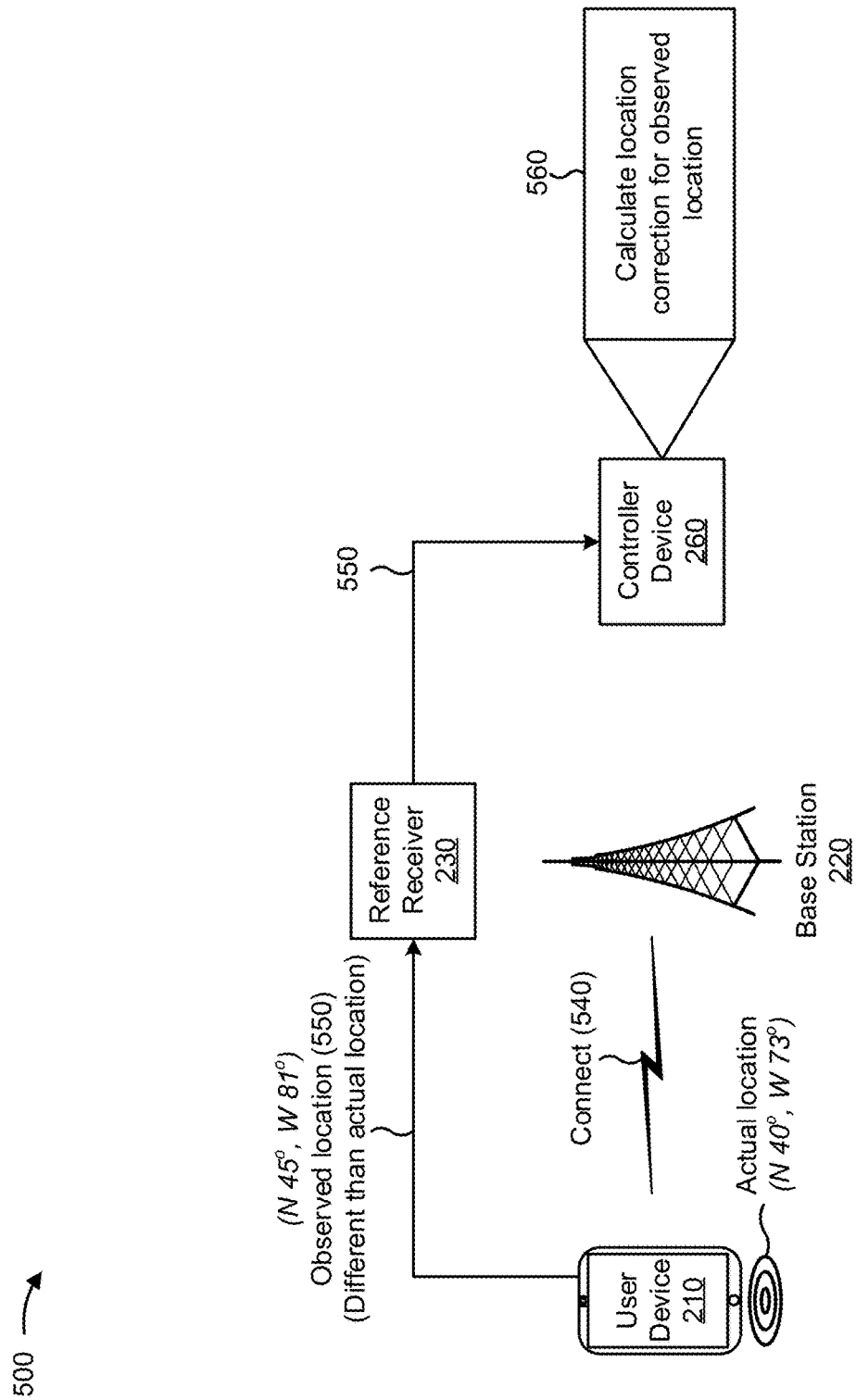
Figure 5C:
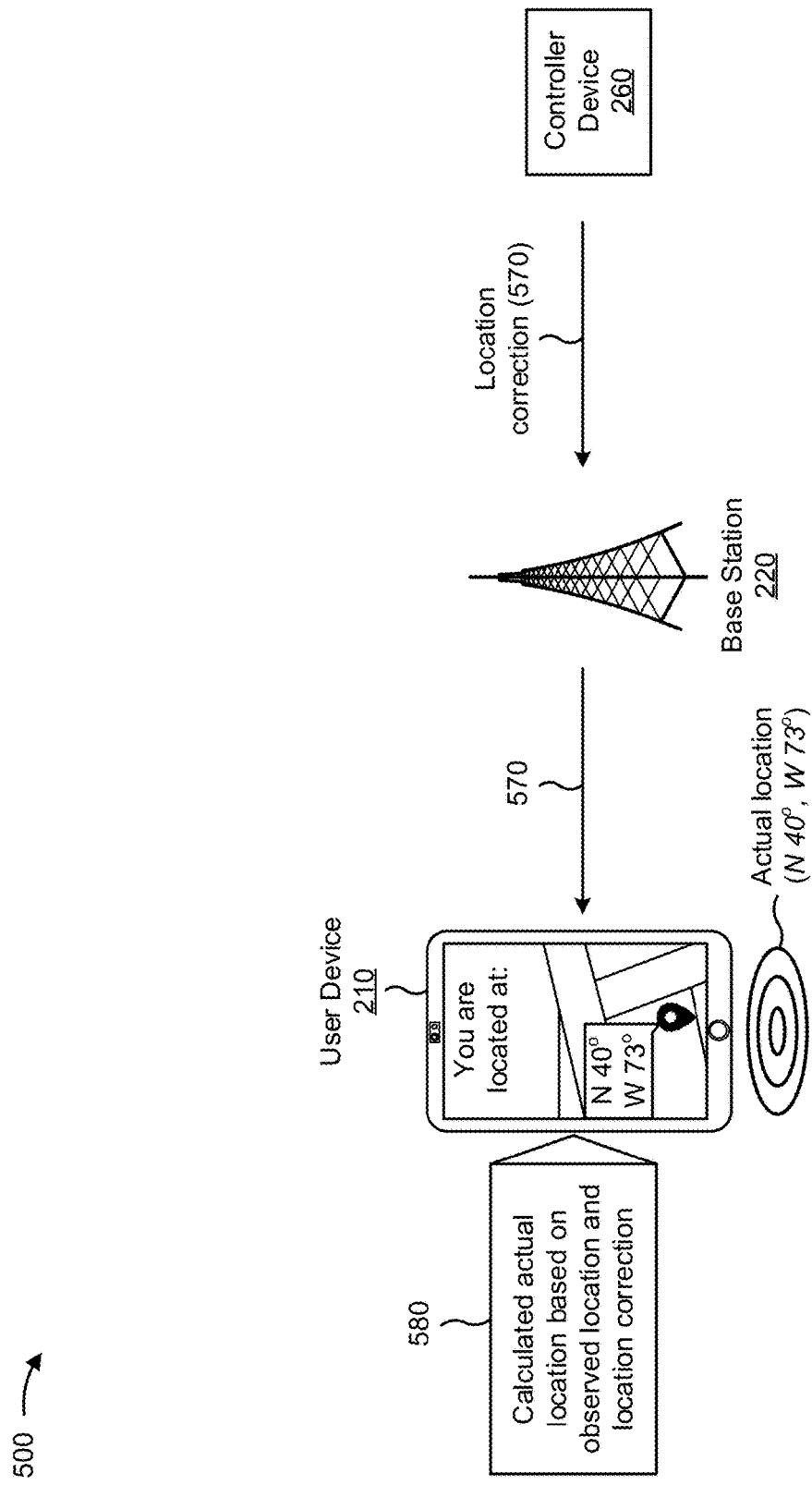

FIGS. 5A-5C are diagrams of an example implementation 500 for capturing reference data associated with a network and for determining a hyper accurate location of a user device based on the reference data. In FIGS. 5A-5C, it is assumed that user device 210 maintains a connection with base station 220, has GNSS carrier phase exposed, and has sufficient resources to calculate an actual location of user device 210 (e.g., RTK capable). For example, user device 210 can detect and expose a GNSS carrier phase, can maintain an active connection with base station 220, and can include sufficient computing resources to combine local and reference observation data and derive a RTK-fixed correction for an observed position of user device 210.

As shown in FIG. 5A, assume that reference receivers 230 provide reference data 510-1 to 510-4 (e.g., raw pseudo range observations and phase range observations received by reference receivers 230) to aggregation devices 250. Aggregation devices 250 can receive reference data 510-1 to 510-4, and can aggregate and synchronize reference data 510-1 to 510-4 to create aggregated reference data 520-1 and 520-2. As further shown in FIG. 5A, aggregation devices 250 can provide aggregated reference data 520-1 and 520-2 to controller device 260. Controller device 260 can receive aggregated reference data 520-1 and 520-2, and can calculate location error information for each reference receiver 230 based on aggregated reference data 520-1 and 520-2, as indicated by reference number 530. For example, controller device 260 can process aggregated reference data 520-1 and 520-2 from multiple reference receivers 230 to deduce the impact of various satellite and terrestrial biases at each reference receiver 230. Controller device 260 can interpolate the effects between and among reference receivers 230 to determine an error surface (e.g., the location error information) across a region for each bias.

As shown in FIG. 5B, assume that user device 210 is located at an actual location (e.g., N 40°, W 73°), and connects to base station 220, as indicated by reference number 540. When user device 210 connects to base station 220, user device 210 can provide information identifying an observed location 550 (e.g., N 45°, W 81°) of user device 210, which is different than the actual location of user device 210, to reference receiver 230. As further shown in FIG. 5B, reference receiver 230 can receive the information identifying observed location 550, and can forward the information identifying observed location 550 to controller device 260. Controller device 260 can receive the information identifying observed location 550, and can calculate a location correction for observed location 550 based on location error information associated with reference receiver 230, as indicated by reference number 560.

As shown in FIG. 5C, controller device 260 can provide information identifying a location correction 570 to base station 220, and base station 220 can forward the information identifying location correction 570 to user device 210. User device 210 can receive the information identifying location correction 570, and can calculate (e.g., using RTK positioning) the actual location of user device 210 based on the information identifying observed location 550 and the information identifying location correction 570. As further shown in FIG. 5C, user device 210 can display the actual location (e.g., N 40°, W 73°) of user device 210 in an application (e.g., a map application) associated with user device 210.

As indicated above, FIGS. 5A-5C are provided merely as an example. Other examples are possible and can differ from what was described with regard to FIGS. 5A-5C. In some implementations, the various operations described in connection with FIGS. 5A-5C can be performed automatically (without user input) or at the request of a user.

Figure 6A:
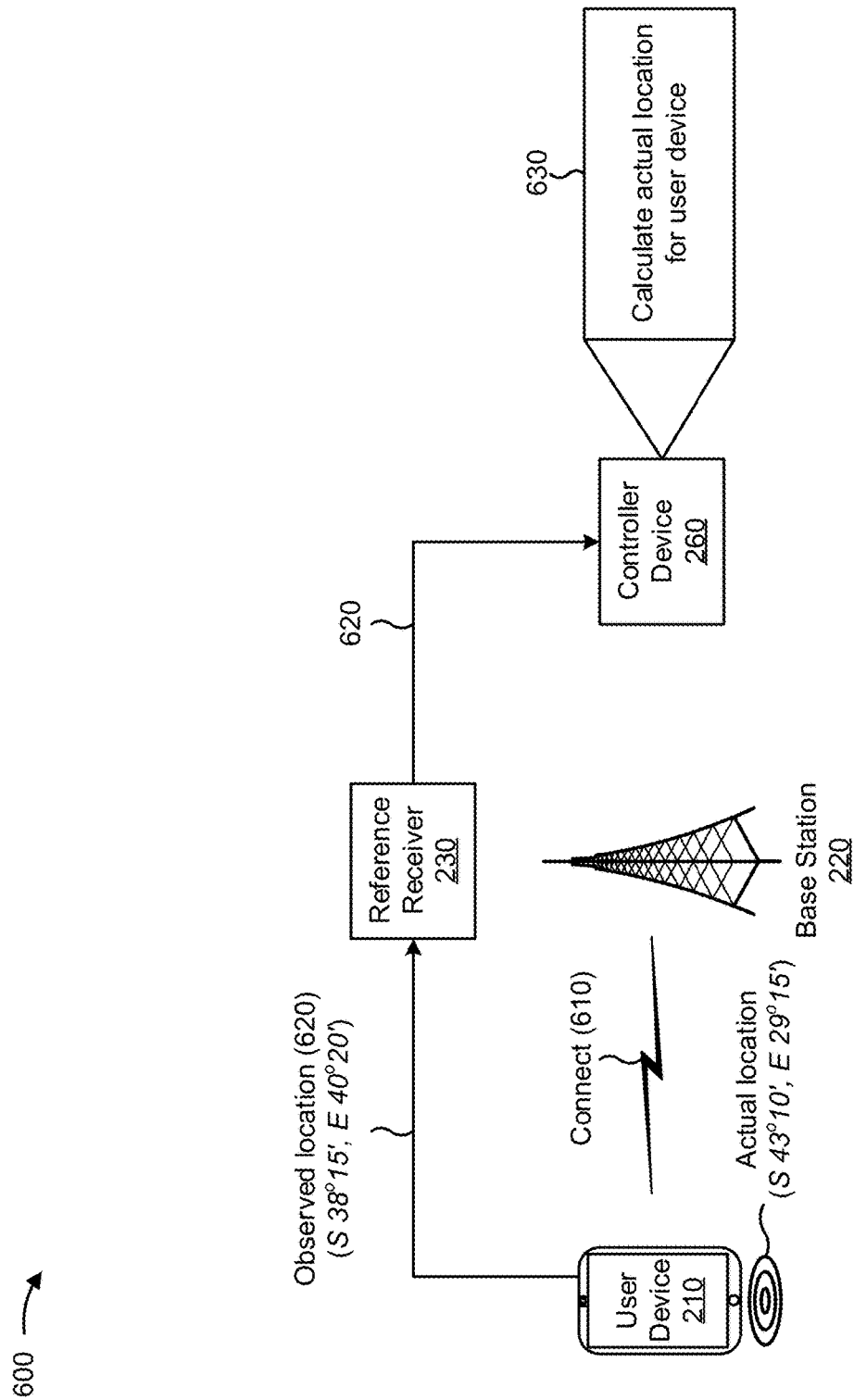
FIGS. 6A and 6B are diagrams of an example implementation for determining a hyper accurate location of a user device that is incapable of determining an actual location.
Figure 6B:
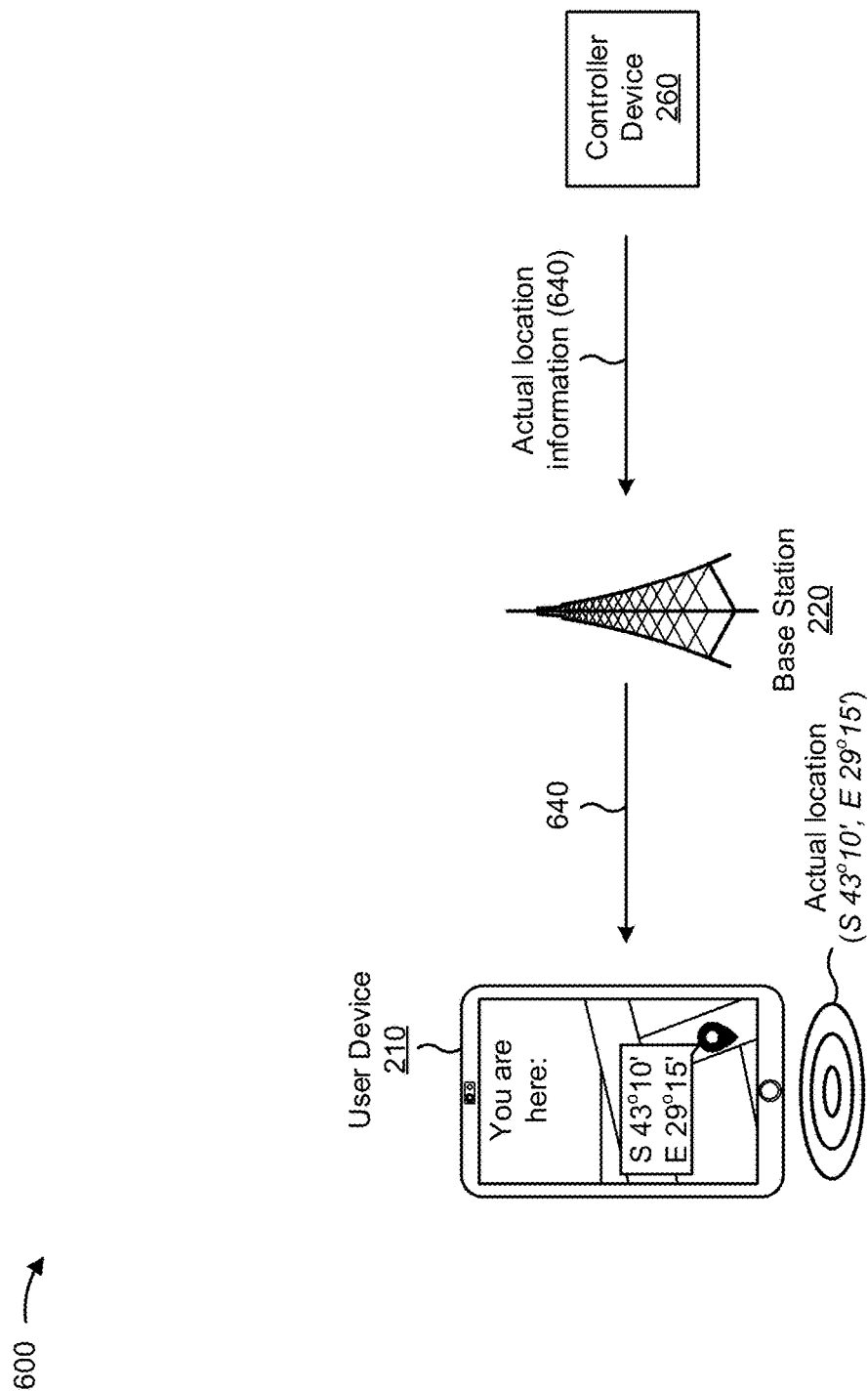

FIGS. 6A and 6B are diagrams of an example implementation 600 for determining a hyper accurate location of a user device that is incapable of determining an actual location of user device 210. In FIGS. 6A and 6B, it is assumed that user device 210 cannot calculate the actual location of user device 210 since user device 210 is incapable of performing RTK positioning.

As shown in FIG. 6A, assume that user device 210 is located at an actual location (e.g., S 43° 10', E 29° 15'), and connects to base station 220, as indicated by reference number 610. When user device 210 connects to base station 220, user device 210 can provide information identifying an observed location 620 (e.g., S 28° 15', E 40° 20') of user device 210, which is different than the actual location of user device 210, to reference receiver 230. As further shown in FIG. 6A, reference receiver 230 can receive the information identifying observed location 620, and can forward the information identifying observed location 620 to controller device 260. Controller device 260 can receive the information identifying observed location 620, and can calculate the actual location for user device 210 based on the information identifying observed location 620 and location error information associated with reference receiver 230, as indicated by reference number 630.

As shown in FIG. 6B, controller device 260 can provide actual location information 640 (e.g., identifying the actual location of user device 210) to base station 220, and base station 220 can forward actual location information 640 to user device 210. User device 210 can receive actual location information 640, and can display the actual location (e.g., S 43° 10', E 29° 15') of user device 210 in an application (e.g., a map application) associated with user device 210.

As indicated above, FIGS. 6A and 6B are provided merely as an example. Other examples are possible and can differ from what was described with regard to FIGS. 6A and 6B. In some implementations, the various operations described in connection with FIGS. 6A and 6B can be performed automatically (without user input) or at the request of a user.

Figure 7A:
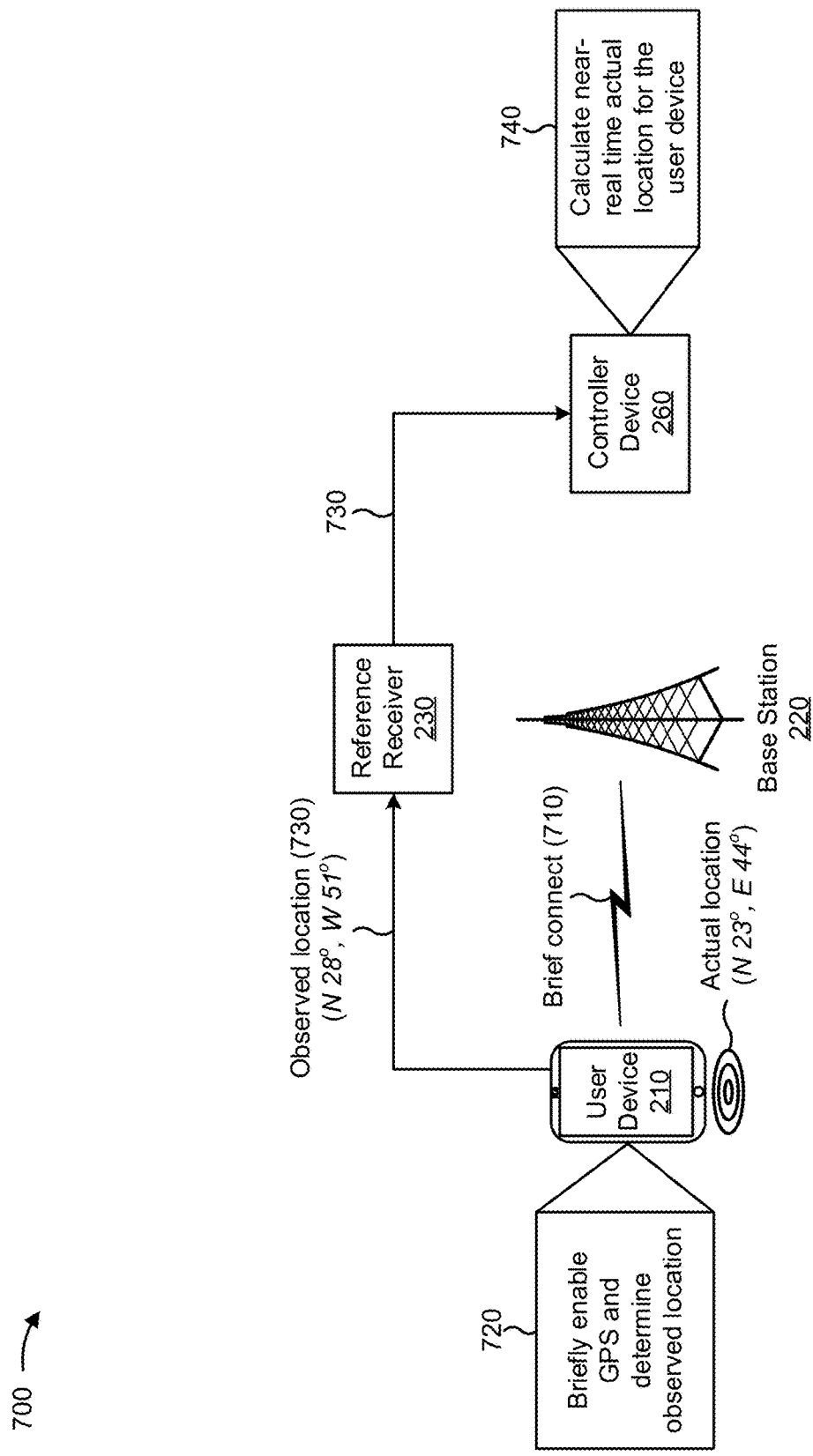
FIGS. 7A and 7B are diagrams of an example implementation for determining a hyper accurate actual location of a user device with an intermittent connection to a network.
Figure 7B:
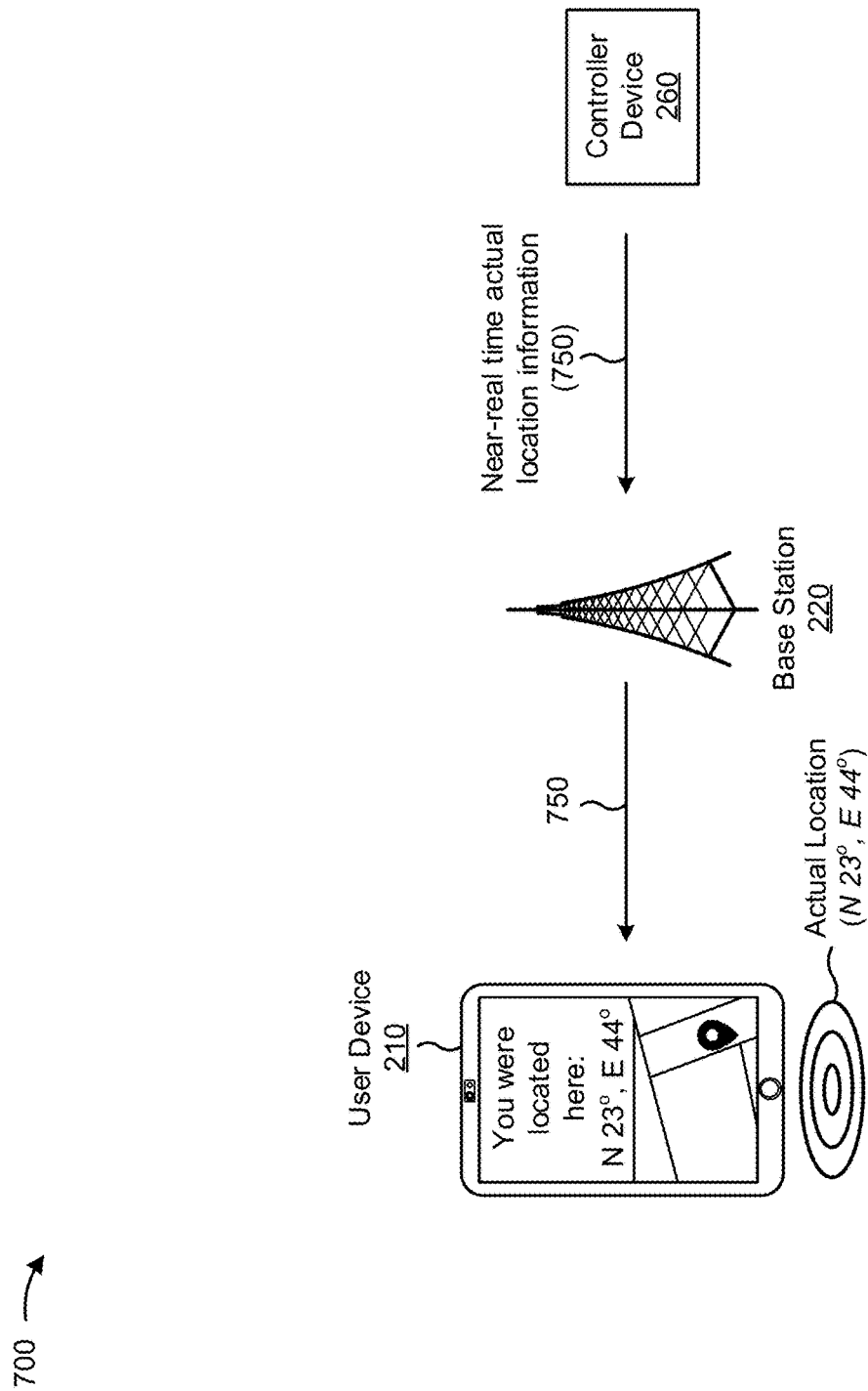

FIGS. 7A and 7B are diagrams of an example implementation 700 for determining a hyper accurate actual location of a user device with an intermittent connection to a network. In FIGS. 7A and 7B, it is assumed that user device 210 intermittently connects with base station 220.

As shown in FIG. 7A, assume that user device 210 is located at an actual location (e.g., N 23°, E 44°), and briefly connects to base station 220, as indicated by reference number 710. When user device 210 briefly connects to base station 220, user device 210 can briefly enable a GPS receiver of user device 210 in order to determine an observed location of user device 210, as indicated by reference number 720. User device 210 can provide information identifying an observed location 730 (e.g., N 25, W 51°) of user device 210, which is different than the actual location of user device 210, to reference receiver 230. As further shown in FIG. 7A, reference receiver 230 can receive the information identifying observed location 730, and can forward the information identifying observed location 730 to controller device 260. Controller device 260 can receive the information identifying observed location 730, and can calculate a near-real time actual location for user device 210 based on the information identifying observed location 730 and location error information associated with reference receiver 230, as indicated by reference number 740.

As shown in FIG. 7B, controller device 260 can provide near-real time actual location information 750 (e.g., identifying the near-real time actual location of user device 210) to base station 220, and base station 220 can forward near-real time actual location information 750 to user device 210. User device 210 can receive near-real time actual location information 750, and can display the actual location (e.g., N 23°, E 44°) of user device 210 in an application (e.g., a map application) associated with user device 210.

As indicated above, FIGS. 7A and 7B are provided merely as an example. Other examples are possible and can differ from what was described with regard to FIGS. 7A and 7B. In some implementations, the various operations described in connection with FIGS. 7A and 7B can be performed automatically (without user input) or at the request of a user.

Figure 8A:
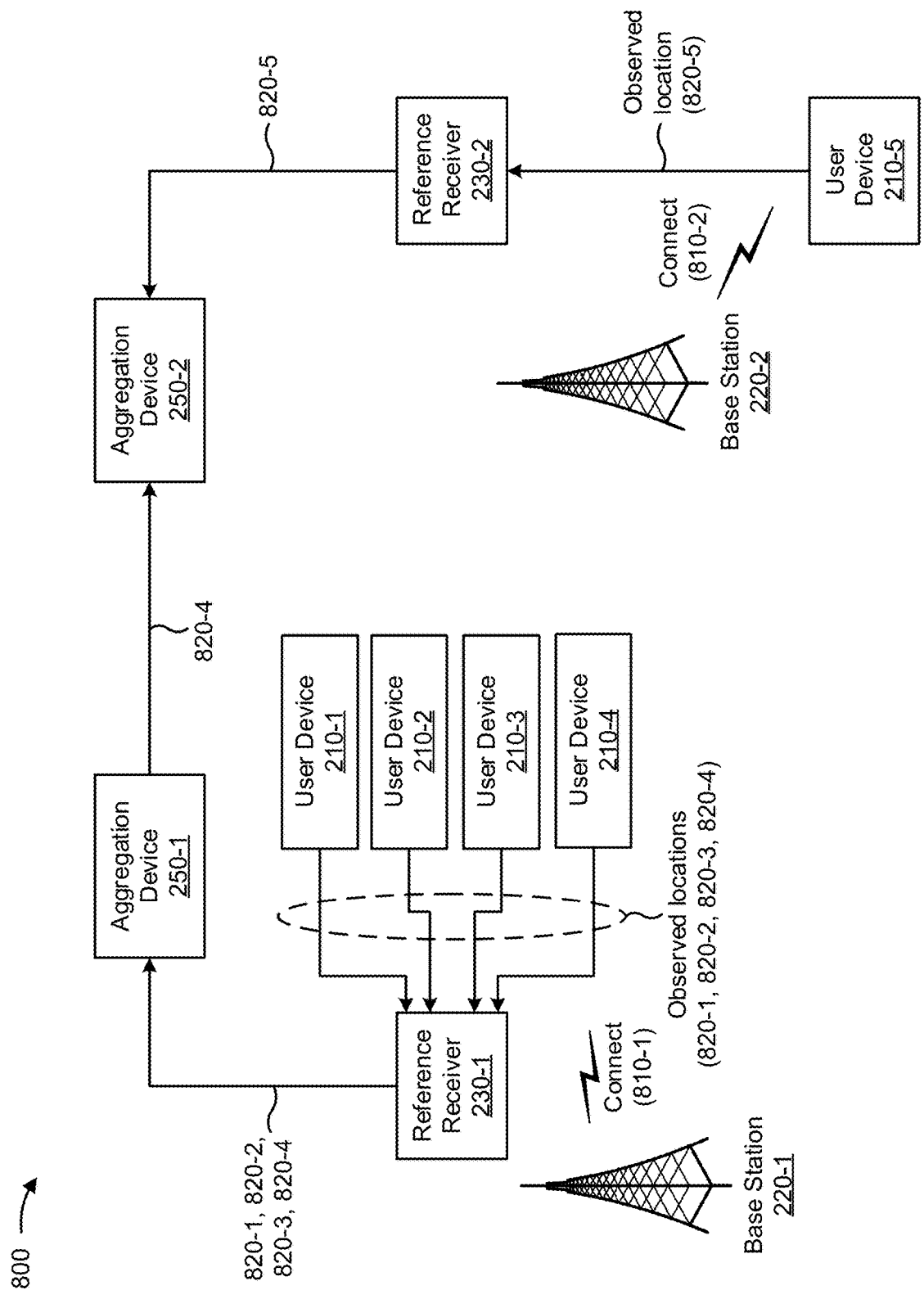
FIGS. 8A and 8B are diagrams of an example implementation for determining a hyper accurate location of a user device with insufficient resources to calculate location.
Figure 8B:
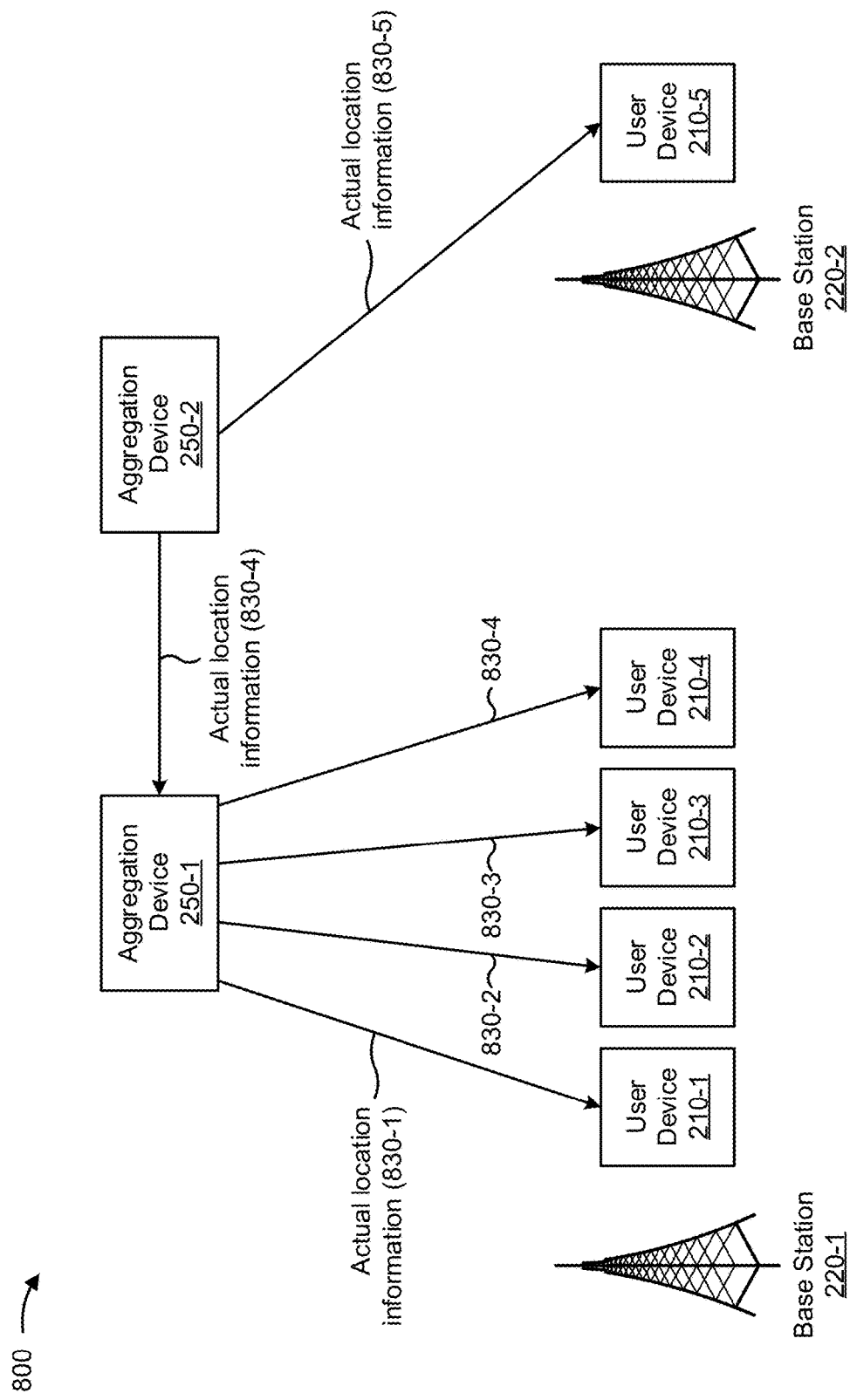

FIGS. 8A and 8B are diagrams of an example implementation 800 for determining a hyper accurate location of a user device with insufficient resources to calculate the location. In FIGS. 8A and 8B, it is assumed that user devices 210-1 to 210-5 cannot calculate actual locations of user devices 210-1 to 210-5 and that aggregation devices 250-1 and 250-2 share processing load.

As shown in FIG. 8A, assume that user devices 210-1 to 210-4 connect to base station 220-1, as indicated by reference number 810-1, and that user device 210-5 connects to base station 220-2, as indicated by reference number 810-2. When user devices 210-1 to 210-4 connect to base station 220-1, user devices 210-1 to 210-4 can provide information identifying observed locations 820-1 to 820-4 of user devices 210-1 to 210-4, which is different than the actual locations of user devices 210-1 to 210-4, to reference receiver 230-1. As further shown in FIG. 8A, reference receiver 230 can receive the information identifying observed locations 820-1 to 820-4, and can forward the information identifying observed locations 820-1 to 820-4 to aggregation device 250-1. When user device 210-5 connects to base station 220-2, user device 210-5 can provide information identifying an observed location 820-5 of user device 210-5, which is different than the actual location of user device 210-5, to reference receiver 230-2. Reference receiver 230 can receive the information identifying observed location 820-5, and can forward the information identifying observed location 820-5 to aggregation device 250-2.

Aggregation device 250-1 can be overloaded and unable to calculate an actual location of user device 210-4. Aggregation device 250-2 can not be overloaded and able to handle additional actual location calculations. In some implementations, aggregation device 250-1 can communicate load information to aggregation device 250-2, and aggregation device 250-2 can communicate load information to aggregation device 250-1. In some implementations, controller device 260 (not shown) can communicate with aggregation devices 250-1 and 250-2 to determine load information. As further shown in FIG. 8A, since aggregation device 250-1 is unable to calculate an actual location of user device 210-4, aggregation device 250-1 can provide information identifying an observed location 820-4 of user device 210-4 to aggregation device 250-2.

Aggregation device 250-1 can calculate the actual locations for user devices 210-1 to 210-3 based on the information identifying observed locations 820-1 to 820-3 and location error information associated with reference receiver 230-1. Aggregation device 250-2 can calculate the actual locations for user devices 210-4 and 210-5 based on the information identifying observed locations 820-4 and 820-5 and location error information associated with reference receivers 230-1 and 230-2.

As shown in FIG. 8B, aggregation device 250-2 can provide actual location information 830-4 (e.g., identifying the actual location of user device 210-4) to aggregation device 250-1. Aggregation device 250-1 can provide actual location information 830-1 to 830-4 (e.g., identifying the actual location of user devices 210-1 to 210-4) to user devices 210-1 to 210-4, via base station 220-1. Aggregation device 250-2 can provide actual location information 830-5 (e.g., identifying the actual location of user device 210-5) to user device 210-5, via base station 220-2. In some implementations, user devices 210-1 to 210-5 can utilize the actual locations of user devices 210-1 to 210-5 in one or more applications associated with user devices 210-1 to 210-5.

As indicated above, FIGS. 8A and 8B are provided merely as an example. Other examples are possible and can differ from what was described with regard to FIGS. 8A and 8B. In some implementations, the various operations described in connection with FIGS. 8A and 8B can be performed automatically (without user input) or at the request of a user.

Figure 9:
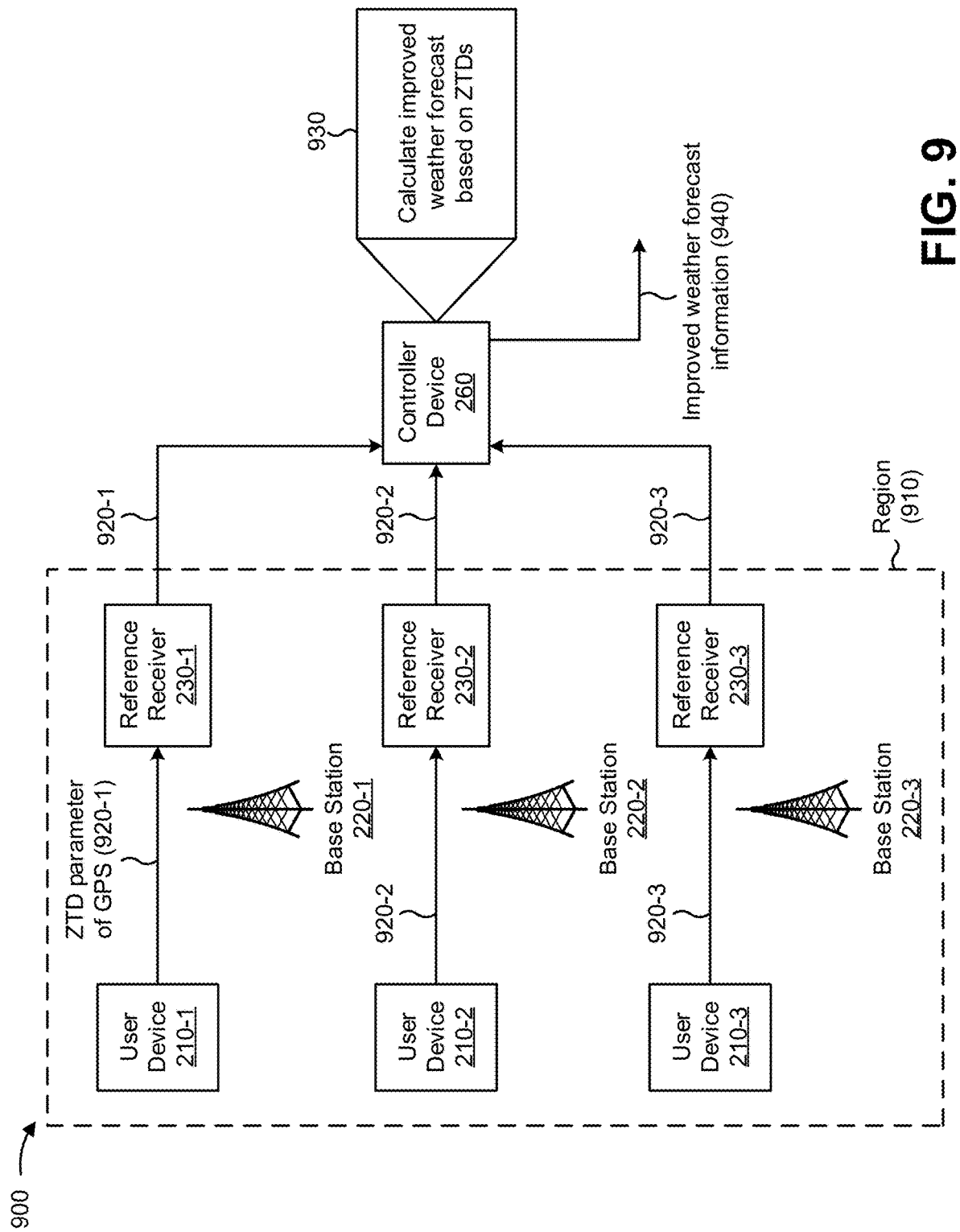
FIG. 9 is a diagram of an example implementation for determining improved weather forecast information with a hyper accuracy location platform.

FIG. 9 is a diagram of an example implementation 900 for determining weather forecast information with a hyper accuracy location platform (e.g., with controller device 260).

As shown in FIG. 9, assume that user devices 210-1 to 210-3 are located in a region 910, and provide zenith total delay (ZTD) parameters 920-1 to 920-3 of GPS signals to reference receivers 230-1 to 230-3. The ZTD parameter of a GPS signal provides tropospheric information related to water vapor, and can aid in weather forecasting. Reference receivers 230-1 to 230-3 can receive ZTD parameters 920-1 to 920-3 of GPS signals, and can provide ZTD parameters 920-1 to 920-3 of GPS signals to controller device 260. Controller device 260 can receive ZTD parameters 920-1 to 920-3 of GPS signals, and can calculate improved weather forecast information (e.g., for region 910) based on ZTD parameters 920-1 to 920-3 of GPS signals, as indicated by reference number 930. In some implementations, controller device 260 can utilize ZTD parameters 920-1 to 920-3 of GPS signals as part of a tropospheric bias analysis in order to determine information about water content of region 910. For example, controller device 260 can utilize ZTD parameters 920-1 to 920-3 of GPS signals to identify an increase in humidity bias, compared to meteorological radiosonde observations, which can be used to improve weather forecasting in region 910. In another example, controller device 260 can utilize ZTD parameters 920-1 to 920-3 of GPS signals to identify significant changes in tropospheric water content, which can be used to accurately identify frontal boundaries and moisture boundaries in region 910.

As further shown in FIG. 9, controller device 260 can provide the improved weather forecast information to a weather service (e.g., the National Weather Service, a local weather service for region 910, and/or the like), as indicated by reference number 940.

As indicated above, FIG. 9 is provided merely as an example. Other examples are possible and can differ from what was described with regard to FIG. 9. In some implementations, the various operations described in connection with FIG. 9 can be performed automatically (without user input) or at the request of a user.

Figure 10:
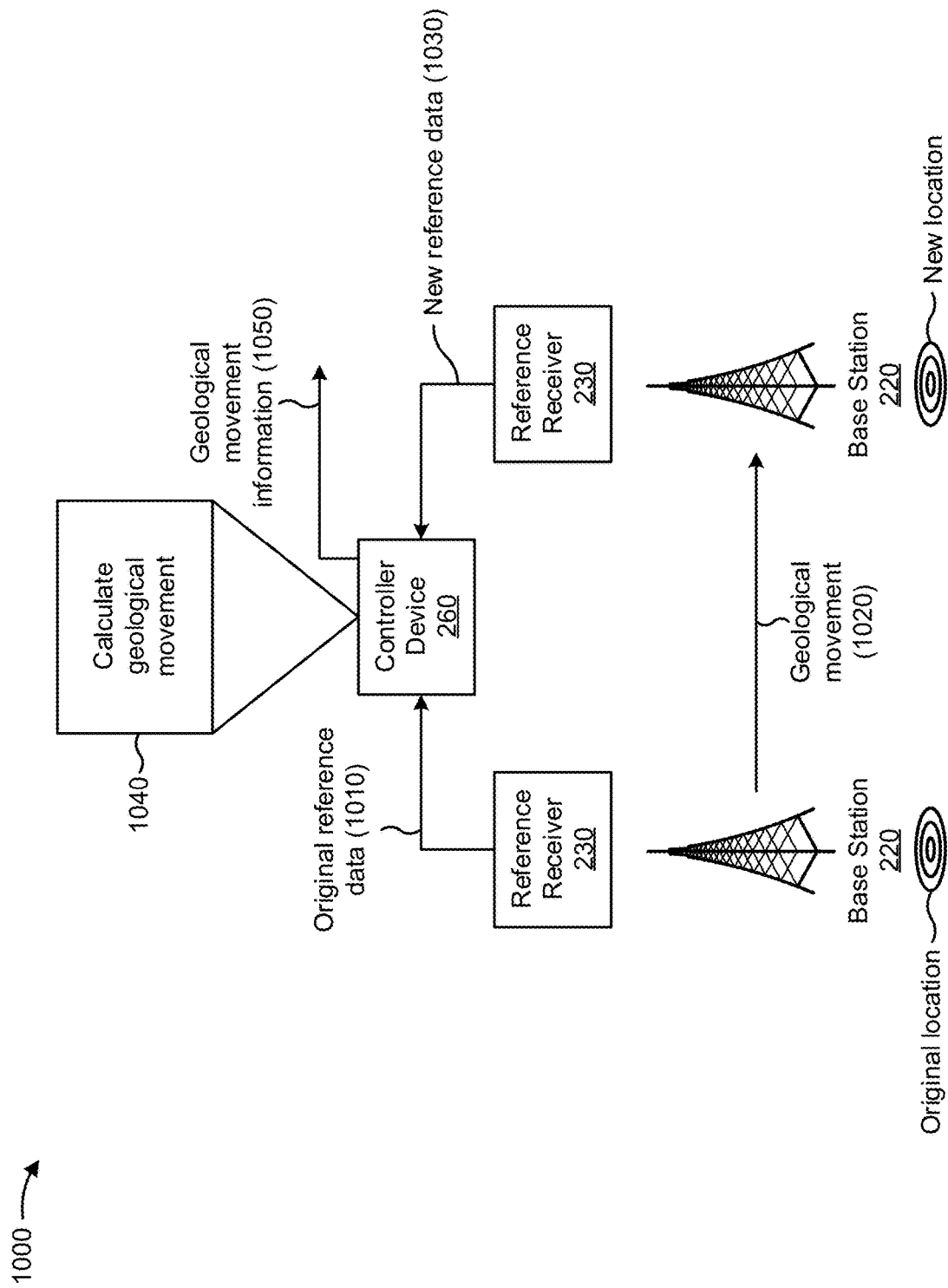
FIG. 10 is a diagram of an example implementation for determining geological movement information with a hyper accuracy location platform.

FIG. 10 is a diagram of an example implementation 1000 for determining geological movement information with a hyper accuracy location platform (e.g., with controller device 260).

As shown in FIG. 10, assume that base station 220 and reference receiver 230 are located at an original location, and that reference receiver 230 provides original reference data 1010 to controller device 260. Original reference data 1010 can include information identifying the original location of base station 220 and reference receiver 230. As further shown in FIG. 10, assume that geological movement 1020 (e.g., movement due to plate tectonics, geologic uplift or settling, and/or the like) causes base station 220 and reference receiver 230 to move from the original location to a new location. After movement from the original location to the new location, reference receiver 230 can provide new reference data 1030 to controller device 260. New reference data 1030 can include information identifying the new location of base station 220 and reference receiver 230. In some implementations, in order to accurately analyze environmental biases, the original location and the new location of reference receiver 230 can be determined with a high degree of precision.

As further shown in FIG. 10, controller device 260 can calculate geological movement information based on original reference data 1010 and new reference data 1030, as indicated by reference number 1040. The geological movement information can include information indicating a distance between the original location and the new location (e.g., which can be caused by plate tectonics, geologic uplift or settling, and/or the like), the information identifying the original location, the information identifying the new location, and/or the like. In some implementations, controller device 260 can provide the geological movement information to an entity interested in geological information (e.g., the United States Geological Survey (USGS)), as indicated by reference number 1050.

As indicated above, FIG. 10 is provided merely as an example. Other examples are possible and can differ from what was described with regard to FIG. 10. In some implementations, the various operations described in connection with FIG. 10 can be performed automatically (without user input) or at the request of a user.

Figure 11:
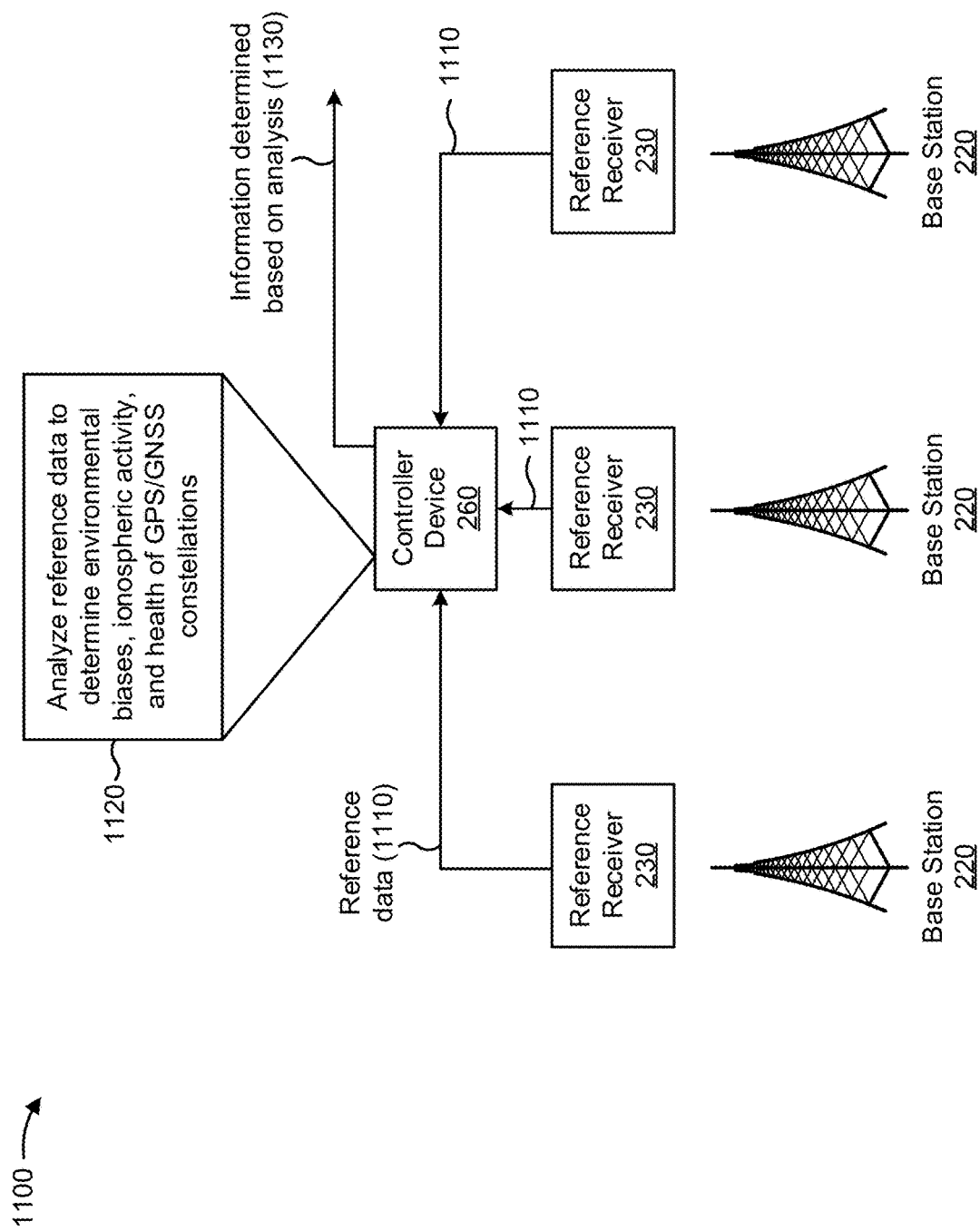
FIG. 11 is a diagram of an example implementation for determining environmental biases, ionospheric activity, and/or health of GPS/GNSS constellations with a hyper accuracy location platform.

FIG. 11 is a diagram of an example implementation 1100 for determining environmental biases, ionospheric activity, and/or health of GPS/GNSS constellations with a hyper accuracy location platform (e.g., with controller device 260).

As shown in FIG. 11, reference receivers 230 can provide reference data 1110 to controller device 260, and controller device 260 can analyze reference data 1110 to determine environmental biases, ionospheric activity, and/or health of GPS/GNSS constellations, as indicated by reference number 1120. In some implementations, reference data 1110 can be utilized by controller device 260 to analyze a GPS space segment, environmental biases, and/or regional ionospheric activity due to variations in space weather. For example, some entities use an infrastructure of reference GPS stations (e.g., known as Continuously Operating Reference Stations (CORS)) to perform analysis of not only the GPS space segment, but also the environmental biases. With a national network of similar CORS stations (e.g., reference receivers 230), aggregation device 250 and/or controller device 260 can also analyze national ionospheric activity due to variations in space weather. Likewise, with a national network of reference receivers 230, aggregation device 250 and/or controller device 260 can perform analysis of the health of the GPS constellation and all GNSS constellations.

In some implementations, reference data 1110 can be utilized by controller device 260 to analyze a health of a GPS constellation and/or a GNSS constellation. As further shown in FIG. 11, controller device 260 can provide information determined based on the analysis of reference data 1110 to an entity interested in such information (e.g., GPS service, GNSS service, the National Weather Service, and/or the like), as indicated by reference number 1130.

As indicated above, FIG. 11 is provided merely as an example. Other examples are possible and can differ from what was described with regard to FIG. 11. In some implementations, the various operations described in connection with FIG. 11 can be performed automatically (without user input) or at the request of a user.

Figure 12:
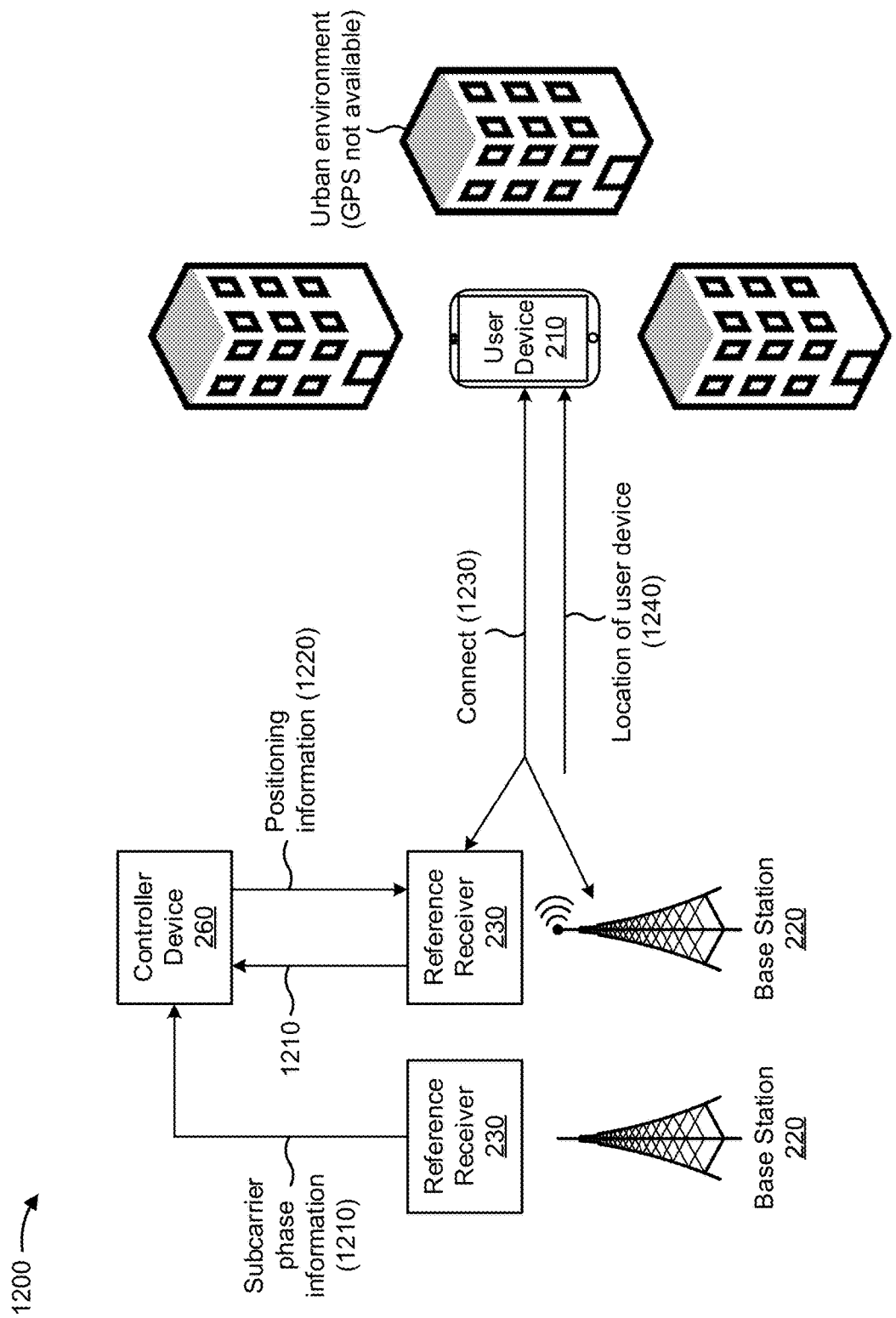
FIG. 12 is a diagram of an example implementation for determining a location of a user device in an environment where GPS signals are unavailable.

FIG. 12 is a diagram of an example implementation 1200 for determining a location of a user device in an environment where GPS signals are unavailable. For example, base station 220 and/or reference receiver 230 can provide actual location information similar to actual location information provided by GPS satellites, in areas where GPS performance is minimal or unavailable.

As shown in FIG. 12, it is assumed that user device 210 is located at a location where GPS performance is minimal or is unavailable (e.g., in an urban environment, such as an urban canyon). Reference receivers 230, associated with base stations 220, can provide subcarrier phase information 1210 to controller device 260, and controller device 260 can receive subcarrier phase information 1210. In some implementations, reference receivers 230 can utilize carrier phase positioning techniques (e.g., used in RTK) on LTE network signals. Similar to GPS carrier modulation, LTE and 5G can send data over a collection of subcarriers. In some implementations, the subcarriers can be modulated using a variety of phase-shift modulation techniques, and reference receivers 230 can track a recovered phase of a carrier signal in order to demodulate data carried in the signal. For example, reference receivers 230 can apply integer ambiguity resolution (AR) techniques, employed in RTK, to the subcarrier phase tracking. This can enable base stations 220 and reference receivers 230 to be utilized as pseudo-satellites that provide location information in challenging outdoor environments (e.g., under tree canopies, in urban canyons, indoors, and/or the like) where GPS performance is minimal or unavailable.

As further shown in FIG. 12, controller device 260 can calculate positioning information 1220 based on subscriber phase information 1210. Positioning information 1220 can include information identifying locations of base stations 220 (e.g., and reference receivers 230), a position of a base station 220 relative to another base station 220, and/or the like. Controller device 260 can provide positioning information 1220 to reference receiver 230, and reference receiver 230 can store positioning information 1220. When user device 210 is located in an area where GPS is not available (e.g., under tree canopies, in urban canyons, and/or the like), user device 210 can connect with base station 220 and reference receiver 230, as indicated by reference number 1230. As further shown in FIG. 12, reference receiver 230 can determine an actual location of user device 210 based on positioning information 1220 and based on a signal received from user device 210, and can provide information identifying the actual location of user device 210 to user device 210, as indicated by reference number 1240 and similar to a GPS satellite.

As indicated above, FIG. 12 is provided merely as an example. Other examples are possible and can differ from what was described with regard to FIG. 12. In some implementations, the various operations described in connection with FIG. 12 can be performed automatically (without user input) or at the request of a user.

Some implementations, described herein, can provide systems and/or methods that provide centimeter-level accuracy for user devices and user device applications and/or services. The systems and/or methods can utilize RTK, a large network of reference base stations, real-time analysis of space and terrestrial biases affecting GPS signals, real-time cloud-based processing of carrier-phase observables from base stations and reference receivers and low-end GPS receivers to provide between sub-meter position accuracy and centimeter to millimeter position accuracy for user devices.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, and/or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned implementations collect, store, or employ personal information provided by individuals, it should be understood that such information shall be used in accordance with all applicable laws concerning protection of personal information. Additionally, the collection, storage, and use of such information can be subject to consent of the individual to such activity, for example, through "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related items, and unrelated items, and/or the like), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
    one or more processors to:
        receive reference data from a plurality of reference receivers associated with a plurality of base stations;
        synchronize the reference data to a reference time to generate synchronized reference data for the plurality of reference receivers;
        process the synchronized reference data to determine location error information associated with one or more of the plurality of reference receivers;
        receive information indicating that a user device, located at an observed location, connects to a particular base station of the plurality of base stations;
        determine a hyper accurate location of the user device, based on particular location error information for a particular reference receiver, of the plurality of reference receivers, associated with the particular base station;
        determine that the user device lacks sufficient functionality to calculate the hyper accurate location of the user device based on the particular location error information for the particular reference receiver, of the plurality of reference receivers, associated with the particular base station; and
        cause information identifying the hyper accurate location of the user device to be provided to the user device based on determining that the user device lacks sufficient functionality to calculate the hyper accurate location of the user device based on the particular location error information for the particular reference receiver, of the plurality of reference receivers, associated with the particular base station.

2. The device of claim 1, where the one or more processors are further to:
    aggregate the reference data to generate aggregated reference data prior to synchronizing the reference data;
    synchronize the aggregated reference data to the reference time to generate synchronized, aggregated reference data for the plurality of reference receivers; and
    process the synchronized, aggregated reference data to determine the location error information associated with the one or more of the plurality of reference receivers.

3. The device of claim 1, where the one or more processors are further to:
    process the synchronized reference data to determine weather forecast information associated with locations of the plurality of the base stations.

4. The device of claim 1, where the one or more processors are further to:
    process the synchronized reference data to determine geological information associated with locations of the plurality of the base stations.

5. The device of claim 1, where the one or more processors are further to:
    process the synchronized reference data to determine environmental biases, ionospheric activity, and/or health of Global Positioning System (GPS)/Global Navigation Satellite System (GNSS) constellations associated with locations of the plurality of the base stations.

6. The device of claim 1, where at least one base station of the plurality of base stations is associated with an evolved packet system that includes at least one of a Long Term Evolution network or an evolved packet core.

7. The device of claim 1, where the user device lacks sufficient functionality to calculate the hyper accurate location of the user device based on at least one of:
the user device lacks sufficient Global Navigation Satellite System capability; a connection between the user device and the device is intermittent; or
the user device lacks sufficient real-time kinematics capability.

8. A non-transitory computer-readable medium storing instructions, the instructions comprising:
one or more instructions that, when executed by one or more processors, cause the one or more processors to:
receive reference data from a plurality of reference receivers associated with a plurality of base stations;
synchronize the reference data to a reference time to generate synchronized reference data for the plurality of reference receivers;
process the synchronized reference data to determine location error information associated with one or more of the plurality of reference receivers;
receive information indicating that a user device, located at an observed location, connects to a particular base station of the plurality of base stations;
determine a hyper accurate location of the user device, based on particular location error information for a particular reference receiver, of the plurality of reference receivers, associated with the particular base station;
determine that the user device lacks sufficient functionality to calculate the hyper accurate location of the user device based on the particular location error information for the particular reference receiver, of the plurality of reference receivers, associated with the particular base station; and
cause information identifying the hyper accurate location of the user device to be provided to the user device to permit the user device to utilize the information identifying the hyper accurate location of the user device with an application executed by the user device.

9. The non-transitory computer-readable medium of claim 8, where the one or more instructions, when executed by the one or more processors, further cause the one or more processors to:
aggregate the reference data to generate aggregated reference data prior to synchronizing the reference data;
synchronize the aggregated reference data to the reference time to generate synchronized, aggregated reference data for the plurality of reference receivers; and
process the synchronized, aggregated reference data to determine the location error information associated with the one or more of the plurality of reference receivers.

10. The non-transitory computer-readable medium of claim 8, where the one or more instructions, when executed by the one or more processors, further cause the one or more processors to:
process the synchronized reference data to determine weather forecast information associated with a location of one of the plurality of the base stations.

11. The non-transitory computer-readable medium of claim 8, where the one or more instructions, when executed by the one or more processors, further cause the one or more processors to:
process the synchronized reference data to determine geological information associated with a location of one of the plurality of the base stations.

12. The non-transitory computer-readable medium of claim 8, where the one or more instructions, when executed by the one or more processors, further cause the one or more processors to:
process the synchronized reference data to determine environmental biases, ionospheric activity, or health of Global Positioning System (GPS)/Global Navigation Satellite System (GNSS) constellations associated with a location of one of the plurality of the base stations.

13. The non-transitory computer-readable medium of claim 8, where at least one reference receiver of the plurality of reference receivers includes a geodetic grade antenna.

14. The non-transitory computer-readable medium of claim 8, where the location error information is based on at least one error surface.

15. A method, comprising:
receiving, by one or more devices, reference data from a plurality of reference receivers associated with a plurality of base stations;
synchronizing, by the one or more devices, the reference data to a reference time to generate synchronized reference data for the plurality of reference receivers;
processing, by the one or more devices, the synchronized reference data to determine location error information associated with one or more of the plurality of reference receivers;
receiving, by the one or more devices, information indicating that a user device, located at an observed location, connects to a particular base station of the plurality of base stations;
determining, by the one or more devices, a hyper accurate location of the user device, based on particular location error information for a particular reference receiver, of the plurality of reference receivers, associated with the particular base station;
determining, by the one or more devices, that the user device lacks sufficient functionality to calculate the hyper accurate location of the user device based on the particular location error information for the particular reference receiver, of the plurality of reference receivers, associated with the particular base station; and
causing, by the one or more devices, information identifying the hyper accurate location of the user device to be provided to the user device, to permit the user device to utilize the information identifying the hyper accurate location of the user device with an application executed by the user device.

16. The method of claim 15, further comprising:
aggregating the reference data to generate aggregated reference data prior to synchronizing the reference data;
synchronizing the aggregated reference data to the reference time to generate synchronized, aggregated reference data for the plurality of reference receivers; and
processing the synchronized, aggregated reference data to determine the location error information associated with the one or more of the plurality of reference receivers.

17. The method of claim 15, further comprising:
processing the synchronized reference data to determine weather forecast information or geological information associated with a location of one of the plurality of the base stations.

18. The method of claim 15, further comprising:
processing the synchronized reference data to determine environmental biases, ionospheric activity, or health of Global Positioning System (GPS)/Global Navigation Satellite System (GNSS) constellations associated with a location of one of the plurality of the base stations.

19. The method of claim 15, where the reference data comprises at least one of raw pseudo range observations or phase range observations.

20. The method of claim 15, where the reference data is in a Radio Technical Commission for Maritime Services format.

\* \* \* \* \*